US012524842B2

(12) United States Patent
Salini

(10) Patent No.: US 12,524,842 B2
(45) Date of Patent: Jan. 13, 2026

(54) METHOD AND DEVICE FOR COMPENSATING FOR GHOST REFLECTION

(71) Applicant: Sony Semiconductor Solutions Corporation, Atsugi (JP)

(72) Inventor: Joseph Salini, Shanghai (CN)

(73) Assignee: Sony Semiconductor Solutions Corporation, Atsugi (JP)

( * ) Notice: Subject to any disclaimer, the term of this patent is extended or adjusted under 35 U.S.C. 154(b) by 505 days.

(21) Appl. No.: 17/926,174

(22) PCT Filed: May 27, 2021

(86) PCT No.: PCT/CN2021/096220
§ 371 (c)(1),
(2) Date: Nov. 18, 2022

(87) PCT Pub. No.: WO2021/239029
PCT Pub. Date: Dec. 2, 2021

(65) Prior Publication Data
US 2023/0196514 A1 Jun. 22, 2023

(30) Foreign Application Priority Data
May 27, 2020 (CN) .......................... 202010463386.5

(51) Int. Cl.
*G06T 5/70* (2024.01)
*G06T 3/20* (2006.01)
(Continued)

(52) U.S. Cl.
CPC ................. *G06T 5/70* (2024.01); *G06T 3/20* (2013.01); *G06T 3/60* (2013.01); *G06T 5/40* (2013.01);
(Continued)

(58) Field of Classification Search
CPC .... G06T 5/70; G06T 3/20; G06T 3/60; G06T 5/40; G06T 5/50; G06T 7/80;
(Continued)

(56) References Cited

U.S. PATENT DOCUMENTS

| 10,621,700 B1* | 4/2020 | Holmes ................ G06V 10/751 |
| 2008/0024669 A1* | 1/2008 | Ogawa ................... H04N 5/211 |
| | | 348/614 |

(Continued)

FOREIGN PATENT DOCUMENTS

| CN | 102362485 A | 2/2012 |
| CN | 107798658 A | 3/2018 |

(Continued)

OTHER PUBLICATIONS

Brauers, Ghosting Reflection Compensation for Multispectral High Dynamic Range Imaging, 2009, Institute of Imaging & Computer Vision, pp. 170-174 (Year: 2009).*

(Continued)

*Primary Examiner* — Oneal R Mistry
*Assistant Examiner* — Justin Philip Cascais
(74) *Attorney, Agent, or Firm* — XSENSUS LLP

(57) ABSTRACT

An electronic device for compensating for ghost reflection in an image captured by an image pick-up device, includes a processing circuit configured to weight an image to be compensated containing the ghost reflection by using a ghost reflection compensation model, wherein the ghost reflection compensation model is related to intensity distribution of the ghost reflection in the image caused by light reflection in the image pick-up device during capturing; and combine the to-be-compensated image and the weighted image to eliminate the ghost reflection from the image.

17 Claims, 14 Drawing Sheets

(51) Int. Cl.
  *G06T 3/60* (2024.01)
  *G06T 5/40* (2006.01)
  *G06T 5/50* (2006.01)
  *G06T 7/80* (2017.01)
(52) U.S. Cl.
  CPC ............... *G06T 5/50* (2013.01); *G06T 7/80* (2017.01); *G06T 2207/10028* (2013.01); *G06T 2207/20224* (2013.01)
(58) Field of Classification Search
  CPC . G06T 2207/10028; G06T 2207/20224; G06T 5/77; H04N 25/61; H04N 17/002; H04N 23/81
  See application file for complete search history.

(56) References Cited

U.S. PATENT DOCUMENTS

| | | | |
|---|---|---|---|
| 2014/0093150 A1 | 4/2014 | Zalev | |
| 2018/0089847 A1 | 3/2018 | Lee et al. | |
| 2020/0327648 A1* | 10/2020 | Lin | G06V 10/30 |

FOREIGN PATENT DOCUMENTS

| | | | | |
|---|---|---|---|---|
| CN | 109218628 A | 1/2019 | | |
| CN | 110062160 A | 7/2019 | | |
| CN | 110632614 A | 12/2019 | | |
| CN | 110688763 A | 1/2020 | | |
| JP | 2008035324 A | * | 2/2008 | ............ H04N 5/211 |
| JP | 2008289034 A | * | 11/2008 | |
| KR | 20170088259 A | 8/2017 | | |
| WO | 2019/164232 A1 | 8/2019 | | |

OTHER PUBLICATIONS

Brauers Johannes et al: "Ghosting Reflection Compensation for Multispectral High Dynamic Range Imaging", Color and Imaging Conference, vol. 17, No. 1, Jan. 1, 2009 (Jan. 1, 2009), pp. 170-174,XP93069325, DOI: 10.2352/CIC.2009.17.1.art00032.

Lefloch Damien et al: "Technical Foundation and Calibration Methods for Time-of-Flight Cameras", SAT 2015 18th International Conference, Austin, TX, USA, Sep. 24-27, 2015; [Lecture Notes in Computer Science; Lect.Notes Computer], Springer, Berlin, Heidelberg, pp. 3-24, XP047269368.

International Search Report and Written Opinion mailed on Sep. 1, 2021, received for PCT Application PCT/CN2021/096220, filed on May 27, 2021, 11 pages including English Translation.

Johannes Brauers et al., "Ghosting Reflection Compensation for Multispectral High Dynamic Range Imaging", Color and Imaging Conference, Jan. 31, 2009, 6 pgs.

* cited by examiner

Close object ghost reflection · scattering effect · close object ghost reflection · scattering effect · close object (a)                               (b)

(a)

(b)

Ghost reflection        Close object (c)

(d)

METHOD AND DEVICE FOR COMPENSATING FOR GHOST REFLECTION

CROSS-REFERENCE TO RELATED APPLICATIONS

The present application is based on PCT filing PCT/CN2021/096220, filed May 27, 2021, and claims priority to Chinese Patent Application No. 202010463386.5, filed on May 27, 2020, the entire contents of each are incorporated herein by reference in its entirety.

FIELD OF THE INVENTION

The present disclosure relates to image processing, in particular to image compensation processing.

BACKGROUND

In recent years, object detection/recognition/comparison/tracking in still images or a series of moving images (such as videos) has been widely and importantly applied to fields of image processing, computer vision and pattern recognition, and plays an important role in them. The object can be a part of human body, such as face, hands, body, other creatures or plants, or any other object intended to be detected. Object recognition is one of the most important computer vision tasks, and its goal is to identify or verify a specific object according to input photos/videos, and in turn accurately learn relevant information of the object. Particularly, in some application scenarios, when performing object recognition based on object images captured by an image pick-up device, it is necessary to accurately recognize detailed information of the object from the images, and then accurately recognize the object.

However, the images obtained by current image pick-up devices often contain various noises, and the existence of noises makes qualities of such images worse, which may lead to inaccurate or even wrong detailed information, and then affect the imaging and recognition of objects.

Therefore, an improved technology is needed to improve image processing so as to further suppress noise.

Unless otherwise stated, it should not be assumed that any of the methods described in this section become prior art only because they are included in this section. Similarly, unless otherwise stated, the problems recognized about one or more methods should not be assumed to be recognized in any prior art on the basis of this section.

DISCLOSURE OF THE INVENTION

An object of the present disclosure is to improve image processing so as to further suppress noise in images, especially noise related to ghost reflection, and then improve image quality.

In particular, there may exist ghost in a captured images, which leads to poor image quality. The present disclosure can use a ghost reflection compensation model to compensate the image, effectively remove the ghost from the image, and obtain a high-quality image.

In one aspect, there is provided an electronic device for compensating for ghost reflection in an image captured by an image pick-up device, including a processing circuit configured to: weight the image to be compensated containing the ghost reflection by using a ghost reflection compensation model, wherein the ghost reflection compensation model is related to intensity distribution of the ghost reflection in the image caused by light reflection in the image pick-up device during capturing; and combine the to-be-compensated image and the weighted image to eliminate the ghost reflection from the image.

In another aspect, there is provided a method for compensating for ghost reflection in an image captured by an image pick-up device, comprising: calculation step of weighting the image to be compensated containing the ghost reflection by using a ghost reflection compensation model, wherein the ghost reflection compensation model is related to intensity distribution of the ghost reflection in the image caused by light reflection in the image pick-up device during capturing; and compensation step of combining the to-be-compensated image and the weighted image to eliminate the ghost reflection from the image.

In yet another aspect, there is provided a device comprising at least one processor and at least one storage device, the at least one storage device having stored thereon instructions which, when executed by the at least one processor, can cause the at least one processor to perform the method as described herein.

In yet another aspect, there is provided a storage medium storing instructions which, when executed by a processor, can cause the method as described herein to be performed.

Other features of the present invention will become apparent from the following description of exemplary embodiments with reference to the accompanying drawings.

DESCRIPTION OF THE DRAWINGS

The drawings, incorporated in the description and constituting a part of the description, illustrate the embodiments of the present invention, and serve to interpret the principle of the present invention along with the description. In the drawings, the same or corresponding terms will be denoted by the same or corresponding reference numerals.

Figure 1:
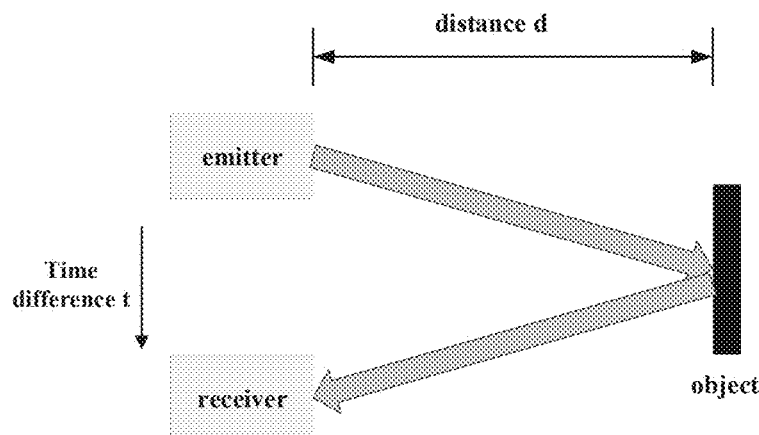
FIG. 1 shows an overview of ToF technology.

Although the embodiments described in this disclosure may be susceptible to various modifications and alternative forms, specific embodiments thereof are shown by way of example in the drawings and are described in detail herein. It should be understood, however, that the drawings and detailed description thereof are not intended to limit the embodiments to the particular forms disclosed, but on the contrary, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For the sake of clarity and conciseness, not all features of the embodiments are described in the description. However, it should be understood that many implementation-specific settings must be made during the implementation of the embodiments in order to achieve specific goals of developers, for example, to meet those constraints related to equipment and business, and these constraints may vary with different implementations. In addition, it should be understood that although the development work may be very complicated and time-consuming, it is only a routine task for those skilled in the art who benefit from this disclosure.

Here, it should also be noted that in order to avoid obscuring the present disclosure by unnecessary details, only processing steps and/or equipment structures closely related to the solutions at least according to the present disclosure are shown in the drawings, while other details not closely related to the present disclosure are omitted.

Embodiments of the present invention will be described in detail below with reference to the accompanying drawings. It should be noted that similar reference numerals and letters indicate similar items in the drawings, and therefore, once an item is defined in one drawing, there is no need to discuss it for subsequent drawings.

In this disclosure, the terms "first", "second" and the like are only used to distinguish elements or steps, and are not intended to indicate time sequence, preference or importance.

In the context of the present disclosure, an image may refer to any of a variety of images, such as a color image, a grayscale image, and the like. It should be noted that in the context of this description, the types of images are not particularly limited as long as such images can be processed for information extraction or detection. In addition, the image may be an original version or a processed version of the image, such as a version of the image that has undergone preliminary filtering or preprocessing before the operation of the present disclosure is performed on the image.

When a scene is photographed by an image pick-up device, noises, which, for example, may include scattering and ghost reflection phenomena, usually exist in an obtained image. Although these noise phenomena may increase artistic effects for photographed images in some cases, such as some landscape photos taken by RGB sensors, in many cases, such noises are particularly harmful to all sensors that use light to measure distance, such as ToF-based sensors, structured light sensors for 3D measurement, etc., compared with RGB sensors. The following will briefly describe the time-of-flight (ToF) technology and the noise problem occurs when a ToF sensor takes photos, with reference to the attached drawings. It should be noted that these noise problems also exist for image sensors based on other technologies, such as structured light sensors and RGB sensors, due to the same principle, which will not be described separately for brevity.

In the time-of-flight technology, a light emitter is used to illuminate a scene, and the time that it takes for light to return to a sensor is measured, that is, the time difference between light emission and light reception, so that the distance from the scene can be calculated based on the measured time, the distance $d=ct/2$, where c is the velocity of light and t is the measured time, as shown in FIG. 1. For example, light emission can be accomplished by pulses (direct time of flight) or continuous waves (indirect time of flight). However, for cameras using ToF-based sensors, noise phenomena, such as scattering and ghost reflection phenomena, may occur when taking photos. Such noise phenomena may be caused by light reflection in the camera.

Figure 2A:
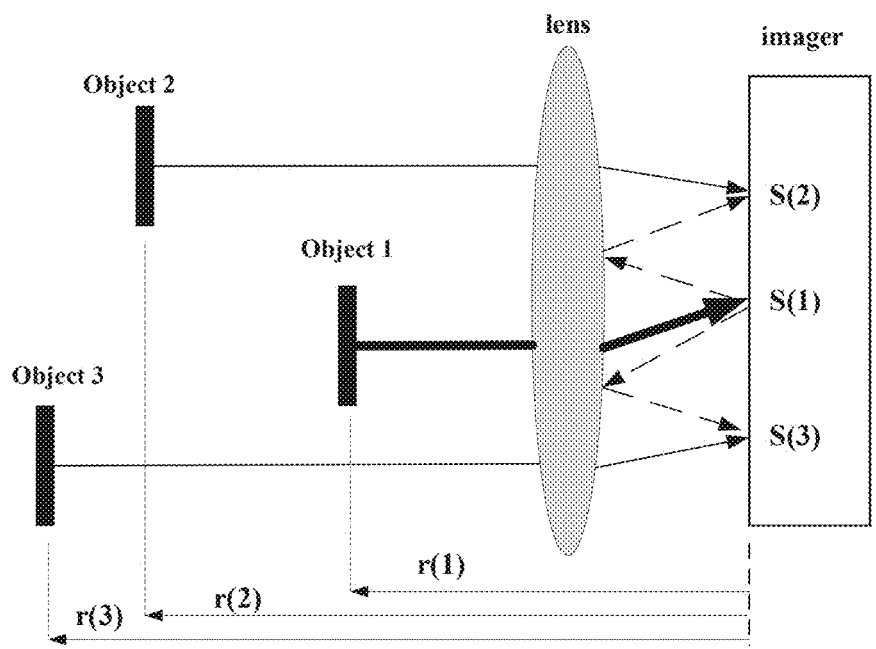
FIG. 2A shows light reflection caused by a close object in close object shooting.

Particularly, when a camera is used to photograph a close object, the close object will return a large amount of active light to the camera, which is equivalent to a bright light source for the camera, thus generating a large amount of light reflection in the camera and thus causing scattering. This will be described below with reference to the drawings. As shown in FIG. 2A, a scene containing three objects is photographed by a camera module, which includes a lens and a sensor, that is, an imager. The distances from objects 1, 2 and 3 to the imager are r(1), r(2) and r(3), respectively, and the light emitted toward each of these three objects is reflected by the object and returned to the corresponding position on the imager in the camera module, that is, imaging positions S(1), S(2) and S(3). The object 1 is very close to the camera module, so that the reflected light has high intensity and will bounce inside the module (for example, between the lens and the imaging device). In the captured image, the signal from object 1 will scatter around its position and will be mixed with signals from objects 2 and 3. The ToF sensor will combine these signals, but provide wrong depths for objects 2 and 3 (the measured depth is between distance r(1) and distance r(2) or r(3)).

Figure 2B:
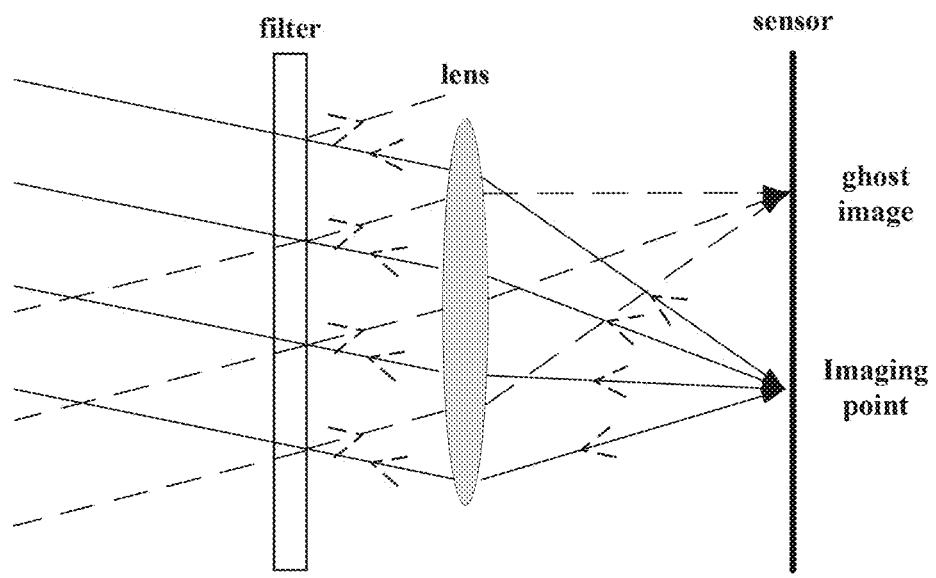
FIG. 2B shows light reflection caused by a photographic filter.

In addition, a photographic filter is often set in front of the lens in a camera, which may lead to ghost reflection. As shown in FIG. 2B, in general, light will be incident on an imaging point on the sensor through the filter and lens, as shown by the solid lines and the arrows thereon, but some light will be reflected from the imaging point towards the lens and transmitted through the lens, as shown by the reverse arrows. At this time, since the photographic filter is provided, the signal will be reflected by the filter toward the lens, and then incident on the sensor via the lens, as indicated by the dotted arrows, just as light from different directions are imaged on the sensor, so as to generate a ghost image in addition to the imaging point.

Figure 3:
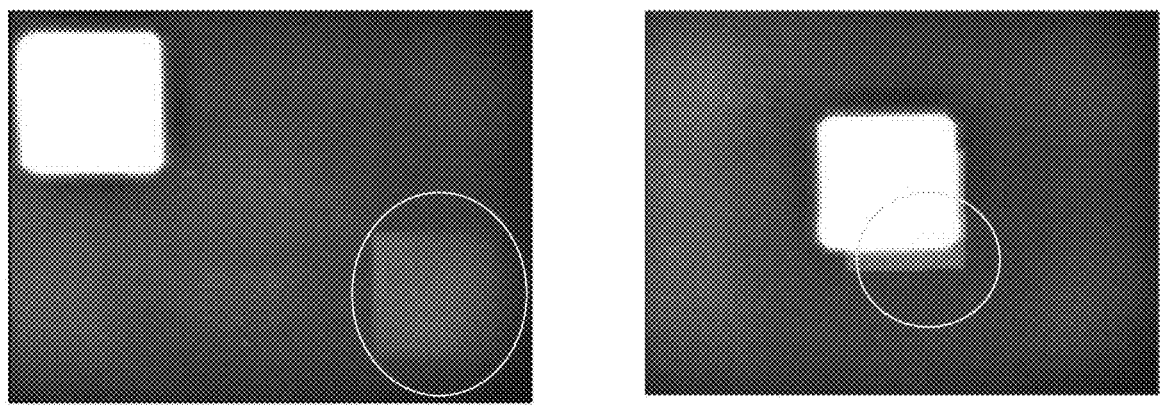
FIG. 3 shows a schematic diagram of ghost phenomenon in an image.

Although this phenomenon can also be seen on RGB sensors, for example, when a close object or a bright object is photographed, a ghost image will appear in the vicinity of the object or at a position centrally symmetrical with the object, particularly the light-colored image with respect to the bright and white patch as indicated by the circle in FIG. 3, the ToF sensor will detect this ghost, which means that the wrong depth would be detected in front of the sensor. The influence of the ghost reflection phenomenon in the picture taken by the camera will be explained below with reference to the attached drawings.

Figure 4A:
FIGS. 4A to 4C show examples of ghost reflections in a confidence image and a depth image.
Figure 4B:
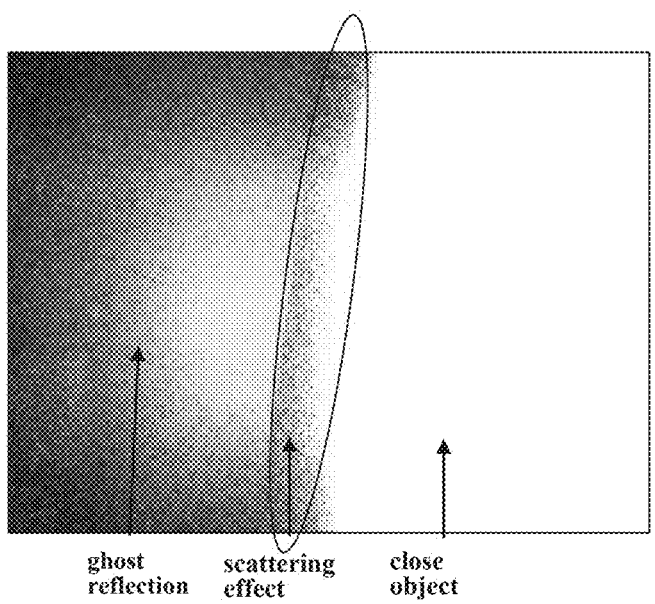
Figure 4C:
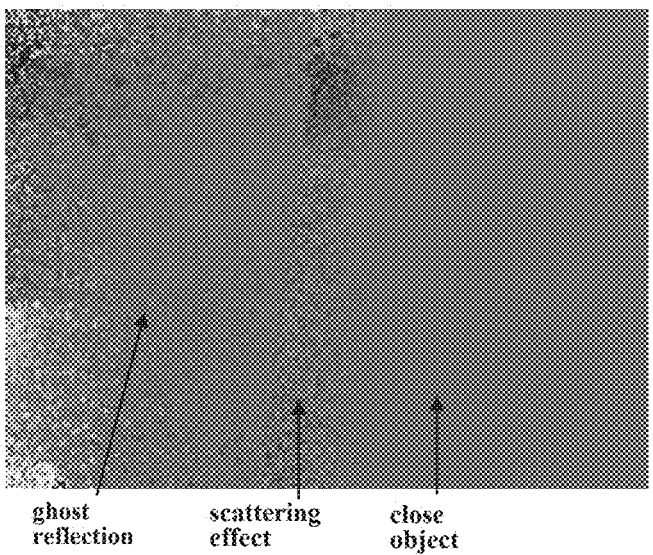

FIG. 4A shows an RGB image of a scene view shot by a mobile phone. The shooting mode is bokeh mode, and the integration time is 300 u s. There is a close object on the right side of the image. FIG. 4B shows the confidence image of the scene view, which indicates the confidence of depth information in the scene view, and in particular, each pixel in the confidence image indicates the confidence of the depth provided by each pixel in the scene view. It can be seen that the right side indicates the close object, which is displayed as bright white due to the close distance, and due to the influence of the close object as mentioned above, a scattering effect, that is, messy white spots close to white, is embodied in the middle part of the image, while a ghost reflection, that is, messy white areas on a dark background, is embodied on the left side of the image. FIG. 4C shows a depth image of the scene view, which indicates depth information of objects in the scene, wherein each pixel in the depth image indicates a distance between the camera and the object in the scene. It can be seen that on the left side of the depth image, there will exist a gray shadow part caused by ghost reflection similar to an object, which is often mistaken for providing depth information. It can be seen from the above that in the captured image, the scattering part is located between the object image and the ghost reflection part. Due to existence of ghost reflection, the wrong depth information of the close object will be provided on the left side of the image, and the depth is usually very shallow, resulting in inability to correctly identify the information of the close object, especially the depth information.

It can be seen from the above that in the case of capturing a scene by using a camera system including a sensor for light ranging, especially a camera system including a ToF sensor, etc., such ghost reflection phenomenon is very harmful, which will lead to detection of wrong depth, and the wrong depth information will adversely affect provision of high-quality images and many subsequent applications. However, in the current technology, there is no special compensation for the ghost reflection in the processing of captured images, so it is impossible to effectively eliminate the ghost reflection to obtain correct object details, especially depth information.

Figure 5A:
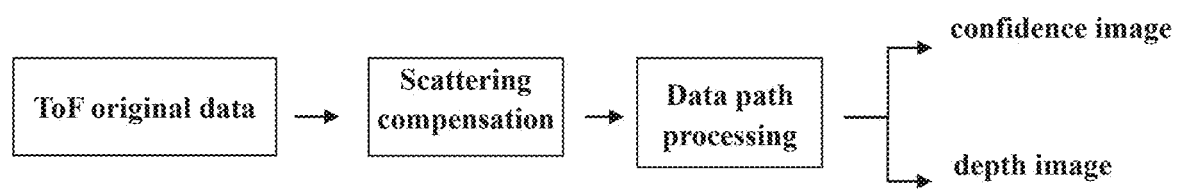
FIG. 5A shows an image processing flow in the solution of the present disclosure including scattering compensation.

FIG. 5A shows the flow of scattering compensation in image processing proposed in this disclosure, in which the scattering compensation is performed on ToF original data, and then subsequent data processing is performed on the data after scattering compensation, to obtain the confidence image and the depth image. The subsequent data processing may include processing for generating the confidence image and the depth image known in the art, which will not be described in detail here.

As mentioned above, the scattering effect may be caused by reflection of light from a close object between the sensor and the lens in the image pick-up device. This will cause some blurs around the object, so the edge of the image is not clear. Modeling can be done by an appropriate function that can describe characteristicies of such blurs generated by points or pixels, such as PSF function (point spread function). Then, according to the modeling result, an algorithm can be applied to eliminate specific blurs generated by all points/pixels in the image. The algorithm may be, for example, a deconvolution algorithm. It should be noted that the modeling and compensation of scattering can be performed by other suitable functions and algorithms known in the art, which will not be described in detail here.

Figure 5B:
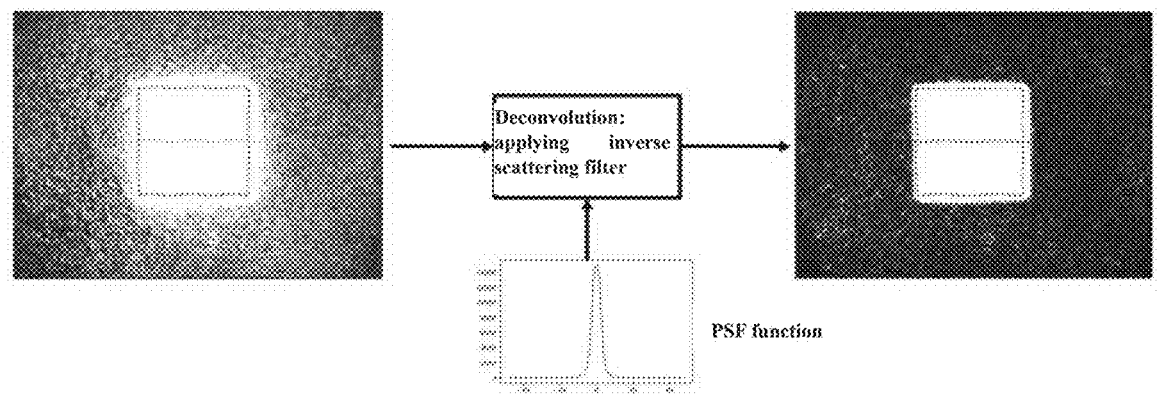
FIG. 5B shows an exemplary scattering compensation operation in the solution of the present disclosure.

FIG. 5B illustrates an exemplary scattering compensation operation according to an embodiment of the present disclosure. When there is a bright white card in the center of the scene as a photographic object, there will be obvious blurs around the object, and blurs may also occur in the whole image, as shown in the left image. For this, a deconvolution algorithm, e.g., inverse transformation, corresponding to the modeling function, e.g., PSF function, will eliminate this scattering, so that the edge of the white patch will be clearer, the blurs in the image will be eliminated, and the scattering effect will be compensated, as shown in the right image.

Figure 5C:
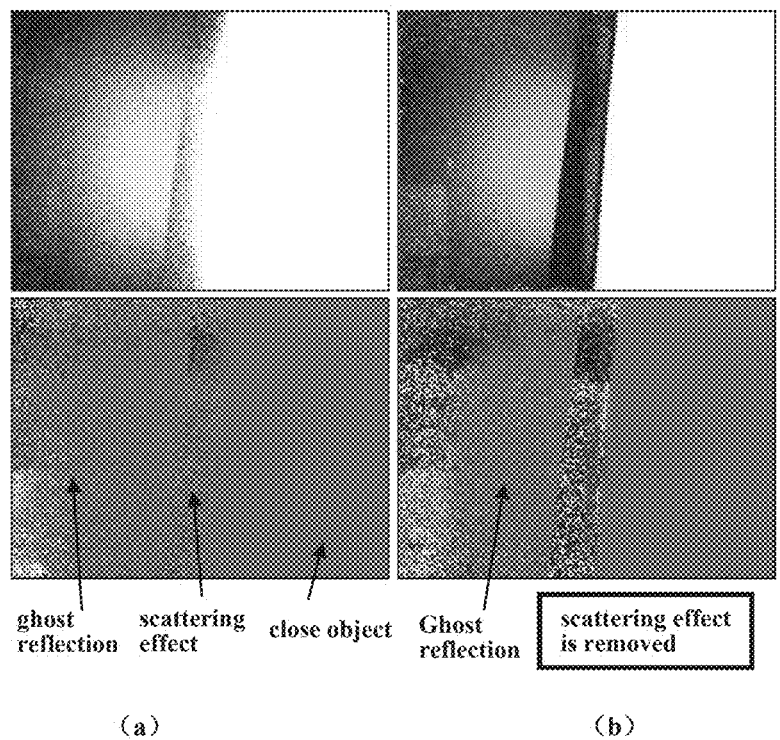
FIG. 5C shows results of scattering compensation in the solution of the present disclosure.

However, scattering compensation cannot effectively eliminate ghost reflection. FIG. 5C shows the result of scattering compensation, and the image contains a confidence image and a depth image corresponding to the RGB image shown in FIG. 4A. In (a), the confidence image and depth image corresponding to the original scene view are indicated from top to bottom, wherein the scattering and ghost reflection are included, and in (b), the confidence image and depth image after scattering compensation are indicated from top to bottom. It can be seen therefrom that even if the scattering noise in the image is removed by scattering compensation, there is still ghost reflection (shadow part) in the left side of the image, and this ghost will still lead to wrong depth measurement.

Therefore, it is an object of the present disclosure to be able to effectively eliminate ghost reflection. Particularly, the present disclosure proposes to weight the data/image to be processed by using the extracted ghost reflection compensation model, and compensate for the data/image to be processed by using the weighted data/image, thereby effectively eliminating the ghost reflection.

As mentioned above, this phenomenon of ghost reflection is especially caused by reflection caused by a filter in a camera system, therefore the ghost reflection compensation technology according to the present disclosure is particularly advantageous for a camera system that additionally uses filters, regardless of the types of sensors, i.e., whether they are ToF sensors, structured light sensors, RGB sensors, or other types of sensors.

Embodiments according to the present disclosure will be described in detail with reference to the accompanying drawings below.

Figure 6:
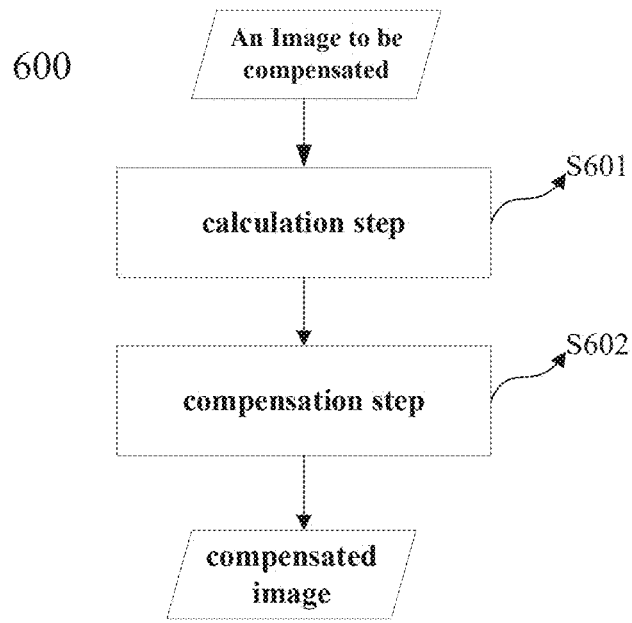
FIG. 6 shows a flowchart of a ghost reflection compensation method according to an embodiment of the present disclosure.

FIG. 6 shows a flowchart of a method for compensating for ghost reflection in an image captured by an image pick-up device according to an embodiment of the present disclosure. The method 600 may include a calculation step S601 of weighting an image to be compensated including ghost reflection by using a ghost reflection compensation model; and a compensation step S602 of combining the to-be-compensated image and the weighted image to eliminate the ghost reflection from the image.

It should be pointed out that the image pick-up device to which the technical solution of the present disclosure can be applied may include various types of optical image pick-up devices, as long as ghost reflection may occur due to light reflection when the image pick-up device captures images. As an example, the image pick-up device may include the aforementioned camera using a photographic filter. As an example, the image pick-up device may include the aforementioned camera for 3D imaging. As an example, the image pick-up device may include the aforementioned camera including a sensor based on ToF technology. As an example, the image pick-up device may also correspond to the aforementioned camera for close-range shooting, and so on.

It should be pointed out that the image to be compensated can be any suitable image, such as an original image obtained by the image pick-up device, or an image that has been subject to specific processing, such as preliminary filtering, anti-aliasing, color adjustment, contrast adjustment, normalization, etc. It should be noted that the preprocessing operation may also include other types of preprocessing operations known in the art, which will not be described in detail here.

According to the embodiment of the present disclosure, the ghost reflection compensation model essentially reflects characteristics of the light reflection in the image pick-up device that causes the ghost reflection, and, that is, is a model obtained based on modeling the light reflection that causes the ghost reflection. For example, as mentioned above, the light reflection may be caused by the photographic filter and/or lens, that is, the light reflection characteristics correspond to those of the photographic filter and/or lens, so the ghost reflection compensation model is essentially a model obtained based on modeling the characteristics of the photographic filter and/or lens. It should be pointed out that this model is not limited to this. When in the image pick-up device, there are other components that may cause the light reflection causing the ghost reflection or even other optical phenomena that cause the ghost reflection, this model is also equivalent to modeling based on the characteristics of such other components or other optical phenomena.

According to one embodiment, the ghost reflection compensation model can be related to intensity distribution of the ghost reflection in an image. For example, the ghost reflection compensation model can be related to the intensity distribution in an image affected by the ghost reflection, such as the intensity distribution of the whole image, or especially the intensity distribution at the source object position and the ghost position.

According to one embodiment, the ghost reflection compensation model can indicate a ghost reflection intensity factor at a specific sub-region in the image, wherein the sub-region contains at least one pixel. As an example, the specific sub-region may be each sub-region covering the entire image. As another example, the specific sub-region may be the sub-region in the image corresponding to the source object and/or the ghost reflection position.

According to an embodiment of the present disclosure, the ghost reflection intensity factor can be derived based on the intensity distribution in the image, preferably based on the intensity distribution of the ghost reflection in the image, and can refer to a factor set to minimize the variation in the compensated scene image, especially the variation of the image intensity between the ghost reflection position and its adjacent area for removing the ghost reflection. As an example, the variation can refer to intensity variation, such as image intensity variation between the ghost reflection area and the adjacent area around the ghost reflection area. In this case, this factor can be called ghost reflection compensation factor.

Figure 8:
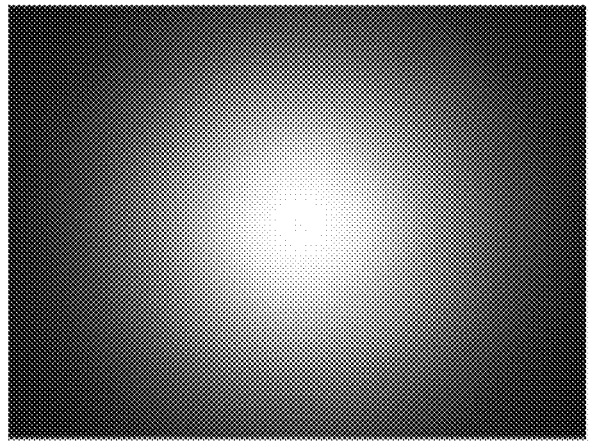
FIG. 8 shows an illustration of a ghost reflection compensation model according to an embodiment of the present disclosure.
Figure 8:
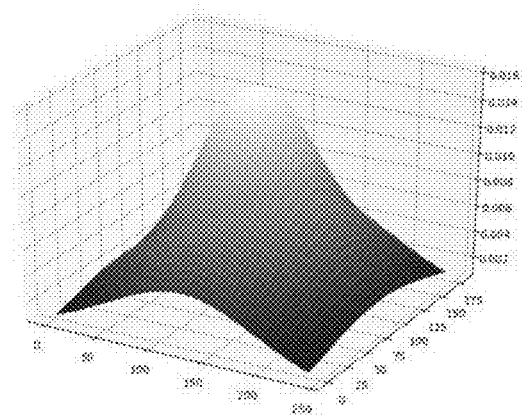

According to the embodiments of the present disclosure, the ghost reflection compensation model can be expressed in various forms. The ghost reflection compensation model will be exemplarily described below with reference to the drawings. FIG. 8 shows an exemplary ghost reflection compensation model according to one embodiment of the present disclosure, in which (a) shows a planar representation of the model and (b) shows a three-dimensional graphical representation of the model, where the horizontal axis and the longitudinal axis indicate the plane size of the model, which corresponds to the image size, and the vertical axis indicates the value of the ghost reflection intensity factor of the model.

According to an embodiment, the model can include various parameters related to intensity factor, central shift, size, etc. In particular, these parameters should be set so that the model matches the characteristics of components in the image pick-up device as much as possible, as described above.

The parameter related to central shift may include parameters cx and cy, which indicate the shift amount of a reference position for image transformation operation (including rotation and shift, for example) in the compensation operation with respect to the image center, for example, in the horizontal and longitudinal directions, respectively. Particularly, the position indicated by the parameters cx and cy actually correspond to the central axis for image rotation, which means that the image will be eccentrically rotated. As an example, cx and cy can directly indicate the shift amount of the central axis for image rotation relative to the image center in the subsequent processing, so that the central axis can be moved to the image center according to the shift amount before the rotation. As another example, cx and cy may correspond to the center point position of the model illustration, such as the center point position of the planar representation shown in FIG. 8, so that the center axis can be moved from this position to the center of the image before the rotation. According to the embodiment, cx and cy may at least depend on the characteristics of the lens, and of course may also be related to the characteristics of other components. The purpose of determining the center shift is to properly position the image, so that the ghost in the rotated image can be aligned with the target in the original image. Specifically, the values of cx and cy can be determined, for example, through experiments or calibration measurements.

The parameter related to size may include parameters width and length, which correspond to width and length of the image (in pixels) respectively. Considering that the model illustration should correspond to the image for convenience of application, the width and height can also indicate the width and length of the model illustration, respectively, as shown by the plane in the three-dimensional illustration in FIG. 8(*b*). And the width and length may depend on pixel arrangement of the sensor.

The parameter related to intensity factor may include a parameter indicating the intensity factor distribution corresponding to the image. The intensity factor distribution can be expressed by an appropriate distribution function to indicate, for example, the ghost reflection intensity factor at each pixel position of the image, as shown in FIG. 8(*b*).

According to an embodiment, the intensity factor distribution is set so that the ghost reflection intensity factor at a sub-region near the center of the image is greater than the ghost reflection intensity factor at a sub-region near the edge of the image. In a case that ghost reflection exists in the captured image, the ghost reflection will present different light intensities according to different appearing positions, especially the light intensity gradually weakening from the center to the edge, and the adverse effects on depth measurement will gradually decrease as the intensity decreases. Therefore, by setting the intensity factor as described above, the ghost reflection in the image can be appropriately weakened or even eliminated. For example, the greater the intensity of the ghost reflection is, the greater the factor for weakening and eliminating the ghost reflection is, thus providing accurate and effective compensation for the ghost reflection.

According to an embodiment, the intensity factor distribution can be determined according to a specific distribution function. According to an embodiment, at least one specific distribution function may be included, and each function may have a corresponding weight. As an example, the intensity factor=$\alpha f(1)+\beta f(2)+$ . . . , where $f(1)$ and $f(2)$ indicate specific functions respectively, and $\alpha$ and $\beta$ indicate the weights for each function respectively. According to an embodiment, the parameters of the distribution function and the weight for the distribution function can be set, for example, according to the characteristics of light reflection in the image pick-up device causing ghost reflection, especially optical characteristics of the components causing the reflection, so as to match (approximate) the characteristics as much as possible. For example, the values of the corresponding parameters can be determined according to empirical values obtained in the preliminary test or experiment, or they can be adjusted on the basis of the empirical values through further calibration operations.

Preferably, the intensity factor distribution follows Gaussian distribution. Two parameters are used to calculate a Gaussian function. The first parameter is std, which means the standard deviation of Gaussian function, and mu means the mean value of Gaussian function. It should be pointed out that these two Gaussian function parameters std, mu can be related to the intensity of reflected light in the image pick-up device that causes the ghost reflection. Particularly, the parameters std, mu may depend on the characteristics, e.g., optical characteristics, of components in the image pick-up device that may cause light reflection, such as the characteristics of lenses, photographic filters, etc. as discussed above. According to an embodiment, the expression of the intensity factor may contain a specific number of Gaussian functions, and each Gaussian function may be given a corresponding weight.

As an example, the model can be expressed as follows, for example:

Center shift:
cx=−2.5, cy=−2.5, width=240, length=180

Intensity factor=1.3*Gaussian(std=38,mu=0)+
0.6*Gaussian(std=50,mu=60)

It should be pointed out that the parameters of the Gaussian functions given in the expression of intensity factor, especially the parameters of the Gaussian functions themselves and the weights of the Gaussian functions, can be selected depending on the optical characteristic graphs of the aforementioned optical components, such as filters and lenses, so that for example, the intensity factor distribution better corresponds to (for example, reversely matches) the optical characteristic graphs in order to eliminate the influence of light reflection caused by the optical characteristics. Alternatively, such parameter can be set to an initial value according to experience, and then adjusted on the basis of the experience value through further calibration operation.

It should be pointed out that expressing the intensity factor by using Gaussian functions in the above ghost reflection compensation model is only exemplary, and other types of distribution functions can be used in this disclosure, as long as such distribution functions can make the model to accurately match the intensity distribution of ghost reflection in the image, especially the characteristics reflecting the light reflection causing ghost reflection in the image pick-up device, such as the characteristics of the components causing the light reflection causing ghost reflection. As an example, the distribution function can adopt other functions with normal distribution. As another example, functions with other distributions, such as Cauchy distribution, gamma distribution, etc., can be used, According to one embodiment, the ghost reflection compensation model is extracted from a predetermined number of images available for calibration. As an example, an image available for calibration is obtained by capturing a specific scene available for calibration by an image pick-up device. The predetermined quantity can be specified by experience, or the quantity used in the previous calibration can be adopted.

Figure 9:
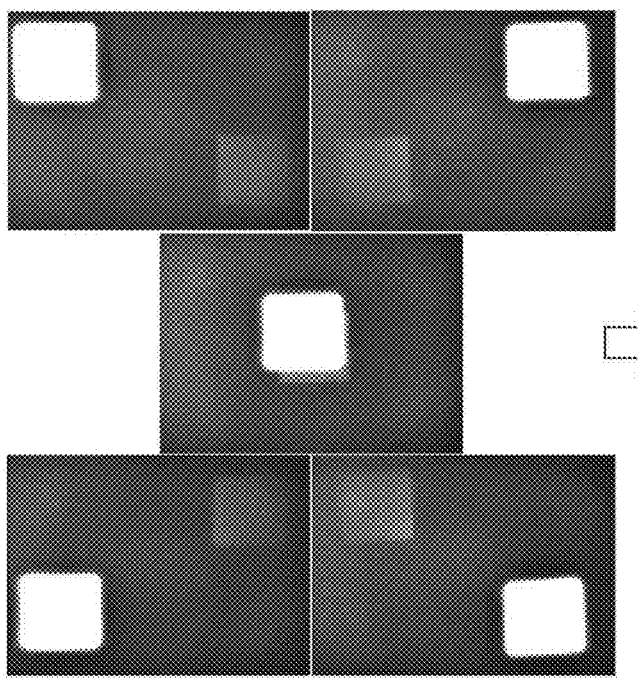
FIG. 9 shows extraction of a ghost reflection compensation model according to an embodiment of the present disclosure.
Figure 9:
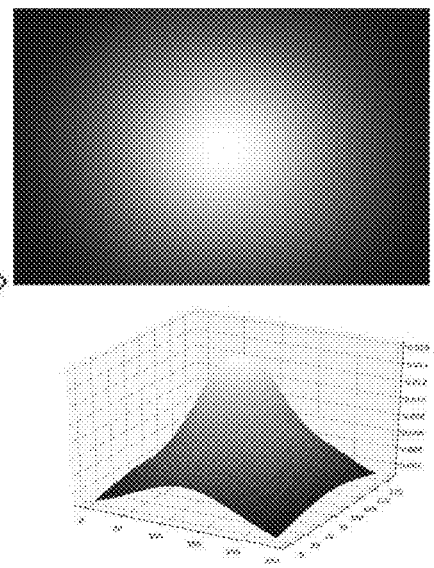

FIG. 9 shows that the model is extracted from multiple images. The left side indicates the images from which the ghost reflection compensation model is extracted, they are images obtained for a calibration scene with white charts, the white charts in respective scene are located in different positions, such as located at four corner positions and the center position, respectively. Each image contains both a bright white patch indicating the white chart and a light-colored patch indicating the ghost reflection. It should be noted that the number and arrangement of images available for calibration are not so limited, as long as the information about ghost reflection can be properly reflected. For example, white charts can be arranged at more positions to obtain more images available for calibration, so as to reflect the information about ghost reflection in the scene in more detail.

According to embodiments of the present disclosure, the ghost reflection compensation model can be extracted from the images available for calibration in various ways. According to an embodiment, the ghost reflection compensation model can be determined so that the intensity variation of a specific number of images available for calibration to which the model is applied meets specific requirements, as mentioned above, the intensity variation can refer to the image intensity variation between the ghost reflection area and the adjacent area around the ghost reflection area, that is, the image intensity difference between the ghost reflection area and the adjacent area around the ghost reflection area. According to another embodiment, alternatively or additionally, the ghost reflection compensation model may be determined to eliminate or mitigate the ghost reflection in the image after the model is applied, and the elimination or mitigation of the ghost reflection may mean that the depth/RGB information measured at the position where the ghost reflection is located is consistent with or close to that in the real scene. That is, the ghost reflection compensation model is extracted on the condition that the intensity variation (and alternatively or additionally, the degree of ghost reflection mitigation) satisfies the specific requirement.

According to an embodiment, the intensity variation satisfying the requirement can refer to a statistical value of variations obtained from all or at least some of a specific number of scene images, such as sum, average, etc. of variations of these scene images, satisifies the requirement. As an example, the specific requirement may mean that the intensity variation is less than a specific threshold, or the specific requirement may mean that the variation of the image is minimal. Therefore, satisfying this specific requirement means that the intensity of the ghost reflection area is basically the same as that of the adjacent area around the ghost reflection area, with small variation, smoothness and no boundary, which can basically eliminate the influence of the ghost reflection.

The model extraction process can be performed in various ways. According to the embodiment, it can be performed in an iterative way. As an example, it is possible to set initial values for various parameters of the ghost reflection compensation model, calculate the above-mentioned image intensity variation (and alternatively or additionally, the ghost reflection mitigation degree) by using the set model, and verify whether the image intensity variation (and alternatively or additionally, the ghost reflection mitigation degree) satisfies the specific requirements. If not, continue to adjust the set values of the parameters, and perform the next operation until the intensity variation satisifies the specific requirement, and determine the corresponding model at this time as the desired ghost reflection compensation model for subsequent image compensation processing. It should be pointed out that the model parameters that can be determined through iterative operations can at least include the related parameters of the distribution function of the model, such as parameters of the Gaussian function itself and the weights for each Gaussian function in the case of existence of two or more Gaussian functions.

Figure 10A:
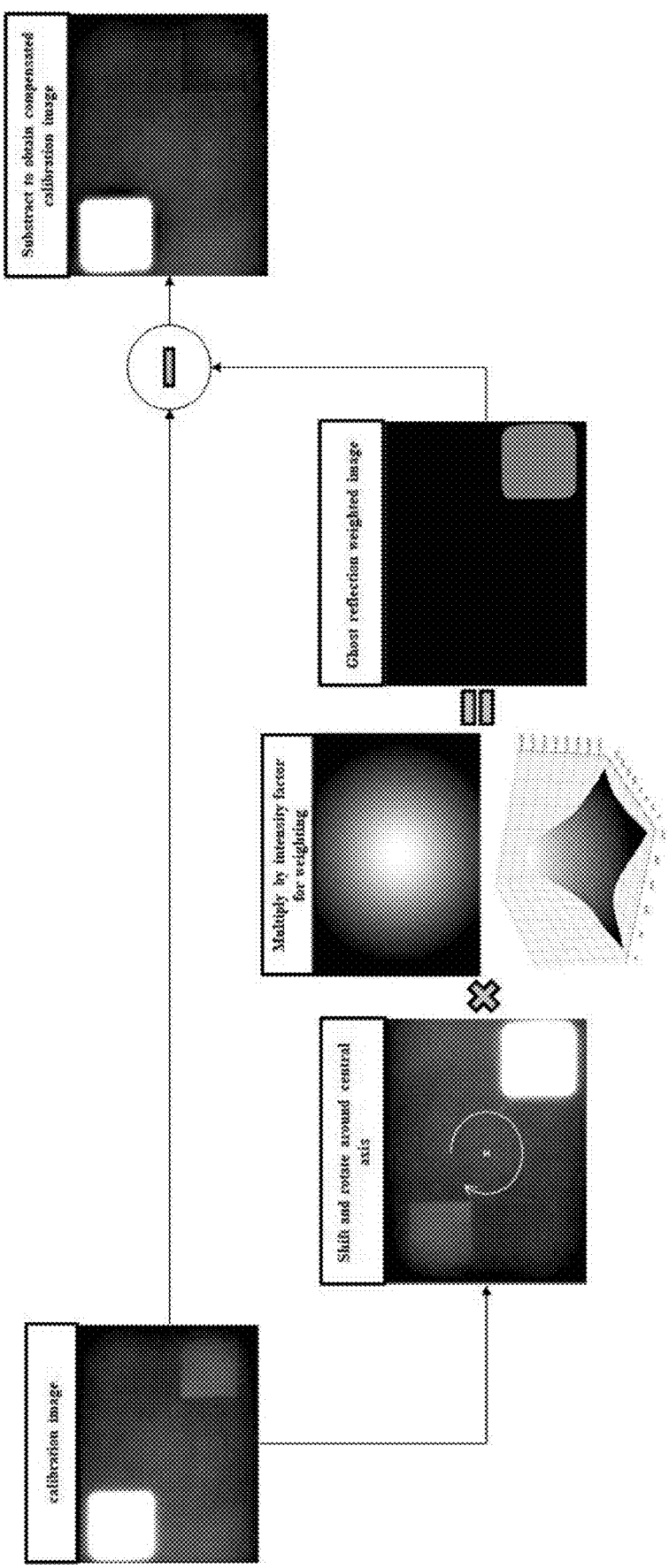
FIG. 10A shows an exemplary basic flow of extracting a ghost reflection compensation model from an image available for calibration according to an embodiment of the present disclosure.

The determination process of intensity variation of one calibration image in one model extraction operation will be described below with reference to FIG. 10A, wherein the calibration image contains the white chart and its ghost reflection, which can be used as an image for deriving the model. It should be noted that such a determination operation flow can be performed for each image used for model extraction, respectively.

Figures 10B, 10C:
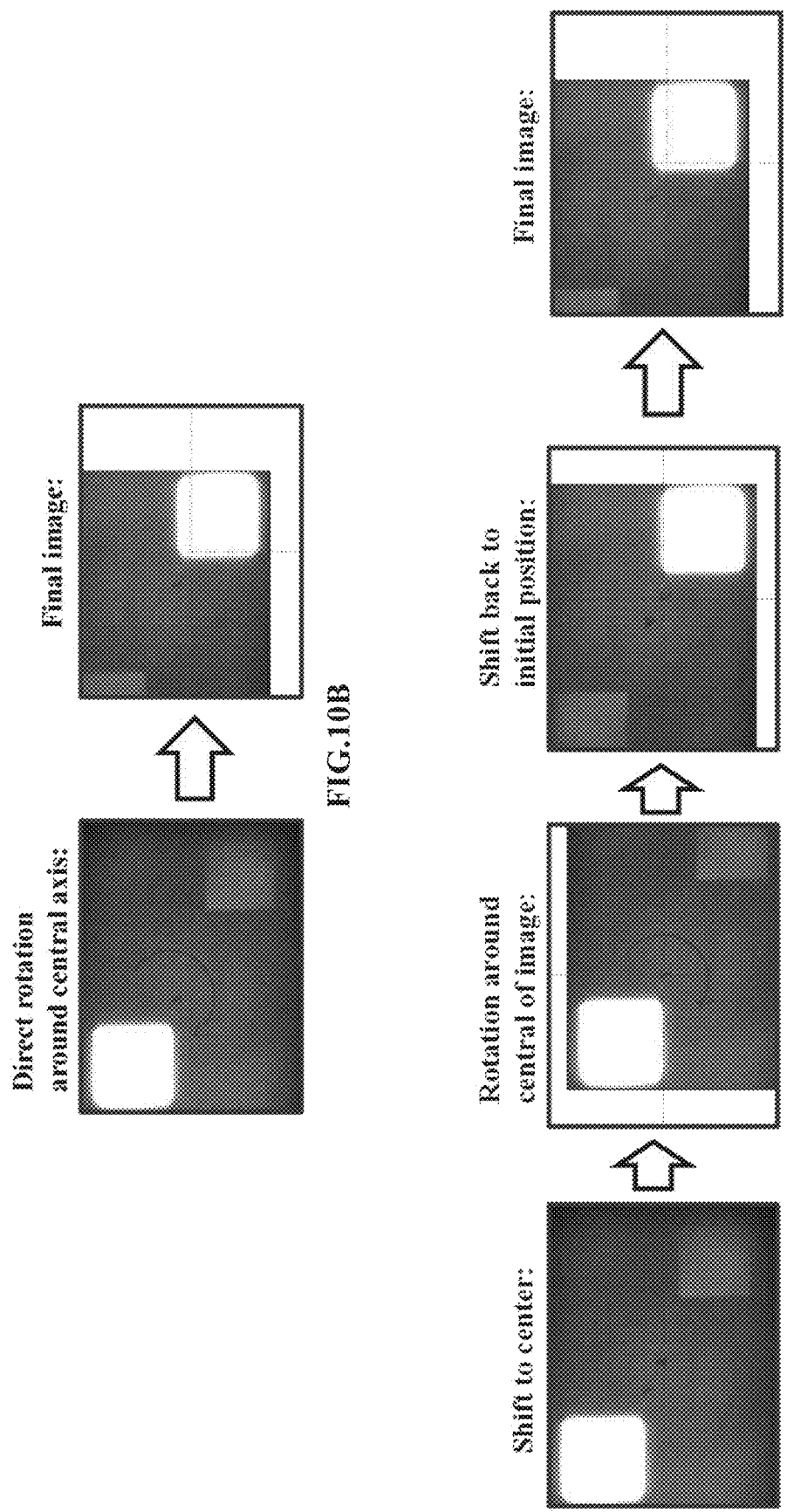
FIGS. 10B and 10C show schematic diagrams of an exemplary image rotation operation according to an embodiment of the present disclosure.

Firstly, an image transformation is performed according to the center shift parameter of ghost reflection compensation model. As mentioned above, the center shift parameter indicates the shift amount of the rotation center relative to the image center, so the image transformation essentially indicates that the image is eccentrically rotated, that is, rotated around the central axis which deviates from the image center. FIG. 10B shows the case of direct rotation by 180 degrees, where the position of the cross symbol corresponds to the eccentric axis position indicated by the center shift, and image transformation can refer to direct rotation around the eccentric axis to obtain the final image.

Image transformation can also be carried out by shifting and rotating operations, that is, shifting, rotating and re-shifting. As shown in FIG. 10C, the rotation center is first shifted according to the parameter values (for example, moved to the center according to cx and cy), then rotated around the center axis at the center, and then the shifted center is reversely shifted according to the parameter values (i.e., moved according to −cx and −cy).

It should be noted that the rotation can be carried out by any angle, as long as the source object and the ghost reflection position in the rotated image overlap with the ghost reflection position and the source object position in the previous image, respectively. As a preferred example, the rotation can be carried out by 180 degrees. According to one implementation, shifting and rotating are performed so that the ghost in the shifted and rotated image corresponds to the position of the object in the original image, while the object in the shifted and rotated image corresponds to the position of the ghost in the original image. In this way, since the position of object in the shifted and rotated image is aligned with the ghost position in the original image, the high intensity of the white patch can be weighted by the intensity factor, and the low intensity at the ghost position can be suppressed by the weighted intensity value, thus effectively suppressing the ghost intensity and realizing the elimination of ghost. On the other hand, the weighted intensity value obtained by weighting other positions in the shifted and rotated image by the intensity factor is very small, which can ensure a small influence on the intensity value of other positions in the original image except the ghost position during suppressing the ghost in the original image.

Then, the transformed image is multiplied by the ghost reflection intensity factor of the ghost reflection compensation model (i.e. the above weighting). Specifically, the factor at each position in the ghost reflection compensation model is multiplied by the pixel intensity at the corresponding position of the transformed image to obtain the image with scaled intensity.

Finally, corresponding intensity subtraction between the original image to be compensated and the rotated and intensity scaled image is performed. For example, the intensity at an area in the original image to be compensated subtracts the intensity at the corresponding area of the image after intensity scaling (e.g., the pixel position at the corresponding position after shift and rotation). Therefore, a compensated image can be obtained, and the intensity variation therein can be calculated, especially the intensity variation (and alternatively or additionally, the ghost reflection mitigation degree) between the ghost reflection position and the adjacent area around the ghost reflection position.

The above determination process can be similarly applied to other images available for calibration, and the intensity variation (and optionally or additionally, the ghost reflection mitigation degree) of each image in this model extraction operation can be obtained, and then it can be judged whether a statistical data of the intensity variations (and optionally or additionally, the ghost reflection mitigation degrees) of these images satisfies a specific condition.

As an example, in a case of threshold condition, it is judged whether the statistical data of the intensity variations of images is less than a predetermined threshold, and/or whether the ghost mitigation degree is greater than the corresponding predetermined threshold. If yes, it can be considered that the currently adopted compensation model is desired, then the model extraction operation is stopped, and the desired model can be used as the ghost reflection compensation model used in the actual shooting process. If not, the parameters of the model can be adjusted step by step, and then the above process can be repeated, until the statistical data of intensity variations satisfies the threshold requirement.

As another example, in a case of minimal condition, if the statistical data of intensity variations determined in this extraction operation is no longer smaller than that in the previous operation, and/or the statistical data of ghost mitigation degree is no longer larger than that in the previous operation, it can be considered that the statistical data of intensity variations is minimized, and the statistical data of ghost mitigation degrees is maximized, and the model extraction operation is stopped, and the compensation model corresponding to the previous operation is taken as the final compensation model.

It should be pointed out that the initial values, step sizes, etc. for the model parameters in the above iterative operations can be set to any suitable values, as long as the values contribute to iterative convergence. In addition, in each of the iterative operations, all model parameters can be changed at the same time, or only one or more parameters can be changed. The former can correspond to a case where all model parameters are determined simultaneously by iteration, while the latter can correspond to a case where one or more parameters are determined by iteration at first, and then based thereon, other parameters are determined by iteration.

According to another implementation, a minimization equation can be constructed by using the ghost reflection compensation model, and when the equation is solved to obtain a solution which can mitigate the ghosts in all scenes to a predetermined degree and minimize the image intensity variation, the desired ghost reflection compensation model will be obtained. As an example, at least one of weights for each Gaussian function, cx, and cy, can be used as variables to construct an equation set.

As an example, the intensity distribution in an image can be expressed as a vector or a matrix, and multiplication of the image and the model, as described above with reference to FIG. 10A, can be expressed as a vector or matrix multiplication in a mathematical sense, so that the operation of determining the intensity variation described in FIG. 10A can be expressed in a vector or matrix manner, and thus an appropriate method can be applied to obtain minimal solution of the equation, such as the least square method.

According to embodiments of the present disclosure, the ghost reflection compensation model may be determined before the image pick-up device is used by the user, such as during the production process, factory testing, and so on. As an example, it can be done in the production process together with other calibration work (for example, temperature compensation, phase gradient, cycle error, etc. for ToF camera). In this way, the ghost reflection compensation model can be built in advance, and stored in an image pickup device, such as a camera.

According to an embodiment of the present disclosure, the ghost reflection compensation model can be determined during usage of the image pick-up device by the user. As an example, the user can be prompted to perform camera calibration when the image pick-up device is used by the user first time. Therefore, the user can capture calibration images according to the operation instruction, thereby deriving the ghost reflection compensation model from the captured images. As another example, in a case where the user has taken a specific number of images (e.g., the shutter has been used a specific number of times, etc.), the user may be prompted to update the model.

According to the embodiments of the present disclosure, the ghost reflection compensation model can be updated or pushed during product maintenance service of the image pick-up device. As an example, when the camera filter and/or lens of the image pick-up device with the ghost reflection compensation function is replaced, or when the image pick-up device without the ghost reflection compensation function is upgraded in software, etc., the above model extraction process can be performed to update or build the model.

It has been described above that the ghost reflection compensation model can be equivalent to characterizing the characteristics of components in the image pick-up device that cause light reflection causing the ghost reflection, especially characteristics of the lens and photographic filter. In a sense, the ghost reflection compensation model corresponds to the lens and/or photographic filter in the image pick-up device. According to one embodiment, if the filter and lens included in the camera, especially the lens, are fixed, the built ghost reflection compensation model can be relatively fixed, especially in the capturing process. According to another embodiment, when the filter and/or lens of the camera are replaceable, the ghost reflection compensation model also needs to be updated accordingly when such components are replaced. According to an embodiment, when the components are replaced, the ghost compensation model corresponding to the replaced components can be extracted automatically, or the user can be prompted to derive such ghost compensation model, as described above. According to another embodiment, the model corresponding to the replaced components can be automatically selected. For example, a set of ghost compensation models corresponding to all filters and/or lenses applicable to the camera system are stored in the camera system in advance. In this way, after the filter and/or lens are replaced in the camera system, the ghost reflection compensation model corresponding to the replaced filter and/or lens can be automatically selected from the stored set for application. According to yet another embodiment, considering that the replacement of the filter and/or lens may often cause change of optical characteristics to some extent, for example, the change of lens characteristics, which will then affect the center shift parameter, when the filter and/or lens are replaced, even if the corresponding model is stored in advance, a new model can be extracted automatically or the user can be prompted to derive the new model, instead of automatic selection. For example, this can be done through system preset or user prompt. For example, it can be preset in the system to automatically update the model in any case. Alternatively, for example, it can prompt whether the user would calibrate the model or the model can be selected automatically.

After the ghost reflection compensation model according to the present disclosure has been determined as described above, the model can be applied to further optimize the captured image and improve the image quality.

According to an embodiment of the present disclosure, in the operation of weighting the image, for each sub-region in the captured image, intensity scaling can be performed by using the corresponding ghost reflection intensity scaling factor in the ghost reflection compensation model, thereby obtaining the intensity scaled image as the weighted image.

According to an embodiment, in the operation of weighting the image, the image to be compensated can be rotated; and the rotated image can be weighted, for example, multipled, by using a ghost reflection compensation model to obtain a weighted image. According to an embodiment, a compensated image is obtained by performing subtraction between pixel intensities at the corresponding positions in the image to be compensated and the weighted image.

It should be noted that the operations here, such as rotation, multiplication, subtraction, etc., can be performed in a manner similar with that as described above with reference to FIG. 10, except that the left input image is a captured image to be compensated, and the right output image is the compensated captured image, in which ghost effect has been effectively eliminated. Particularly, the image to be compensated is shifted and rotated according to the central parameters cx and cy of the ghost reflection compensation model, that is to say, the rotation can be carried out around an axis which deviates from the center of image. During the multiplication operation, each position of the transformed image is multiplied by the corresponding ghost reflection compensation model factor, for example, the model illustration and the transformed image can be multiplied after alignment so as to implement intensity scaling.

Figure 11:
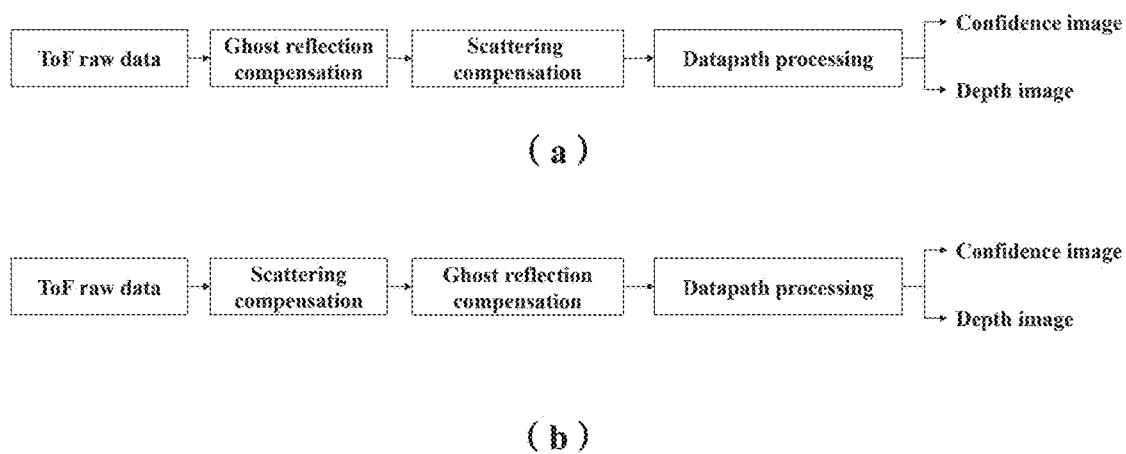
FIG. 11 shows an image processing flow including ghost reflection compensation according to an embodiment of the present disclosure.

According to some embodiments, the ghost reflection compensation operation according to the present disclosure can be performed before or after the scattering compensation, and basically similar advantageous effects can be achieved. FIG. 11(a) shows that ghost reflection compensation is performed before scattering compensation, that is to say, the above-mentioned image to be compensated is the original image obtained by a ToF sensor. And FIG. 11(b) shows that ghost reflection compensation is performed after scattering compensation, that is to say, the above-mentioned image to be compensated is an image that has been subjected to scattering compensation.

According to an embodiment of the present disclosure, the method further includes a scattering compensation step of compensating for scattering in the image. According to some embodiments, the image pick-up device according to the present disclosure is an image pick-up device using a photographic filter. According to some embodiments, the image pick-up device includes a ToF sensor, and the image to be compensated includes a depth image.

The foregoing examples mainly describe the case that the image to be compensated for one scene is one image. However, the embodiments of the present invention can also be used in a case where there are at least two images to be compensated for one scene.

According to some embodiments, the original image data obtained by scene capturing may correspond to at least two sub-images, and the ghost reflection compensation operation according to the present disclosure, including the above-mentioned calculation and compensation steps, is performed for each sub-image, thereby obtaining at least two compensated sub-images. The at least two compensated sub-images can be combined to obtain a final compensated image corresponding to the scene.

Figure 12:
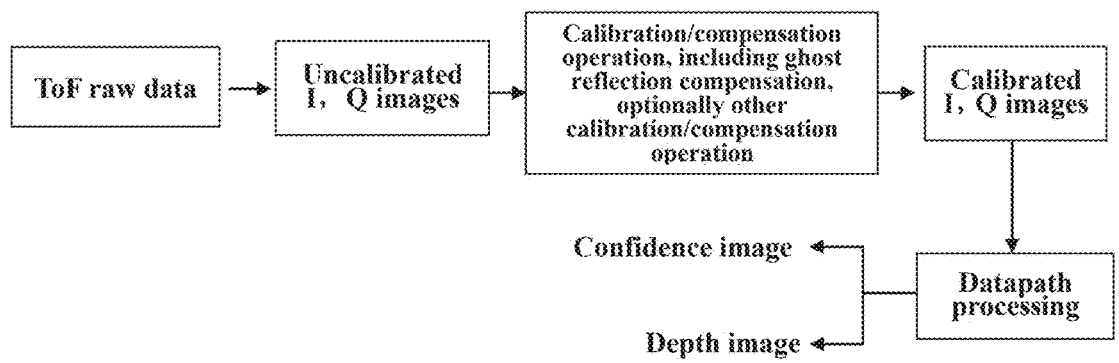
FIG. 12 shows an image processing flow including ghost reflection compensation according to an embodiment of the present disclosure.

As an example, the at least two sub-images include an I image and a Q image corresponding to the original image data. In the following, I and Q images will be taken as examples to explain compensation for sub-images. FIG. 12 shows an example of operation including ghost reflection compensation for I and Q images.

In order to be able to perform distance measurement, an iToF sensor usually needs to capture four components, which are related to the phase shift between emitters (lasers) and the return of light to the sensor in a case of a predefined phase shift. These four components are recorded for 0, 90, 180 and 270 degrees respectively. The four components are obtained as ToF raw data.

I and Q images can be calculated from these raw data, where I can indicate the captured in-phase data, for example, I image is a combination of a component for 0 degree and a component for 180 degree, and Q can indicate the captured quadrature-phase data, for example, Q image is a combination of a component for 90 degree and a component for 270 degree. As an example, their calculation is as follows:

$$I = \text{component (0 degree)} - \text{component (180 degree)}$$

$$Q = \text{component (90 degree)} - \text{component (270 degree)}$$

Then, the I and Q images are compensated respectively, and the specific compensation method can be carried out as described above with reference to FIG. 10, especially the above-mentioned ghost reflection compensation operation is carried out for each of the I and Q images respectively, which will not be described in detail here.

Finally, the compensated I and Q images are used to generate a confidence image and a depth image.

As an example, the confidence image is calculated according to I and Q as follows:

$$\text{Confidence} = \text{abs}(I) + \text{abs}(Q)$$

Where abs ( ) indicates a absolute value function, which indicates the absolute value of the confidence of each sub-region or pixel point in I image and Q image respectively. As an example, the confidence image can also be obtained by other methods known in the art, which will not be described in detail here.

As an example, the depth image can be obtained from at least one of I and Q images, which can be obtained in a manner known in the art and will not be described in detail here.

However, it should be noted that I and Q images are only exemplary. Other types of sub-images are also possible, as long as they can be captured by an image pick-up device and can be combined to obtain a confidence image and a depth image.

Figure 13:
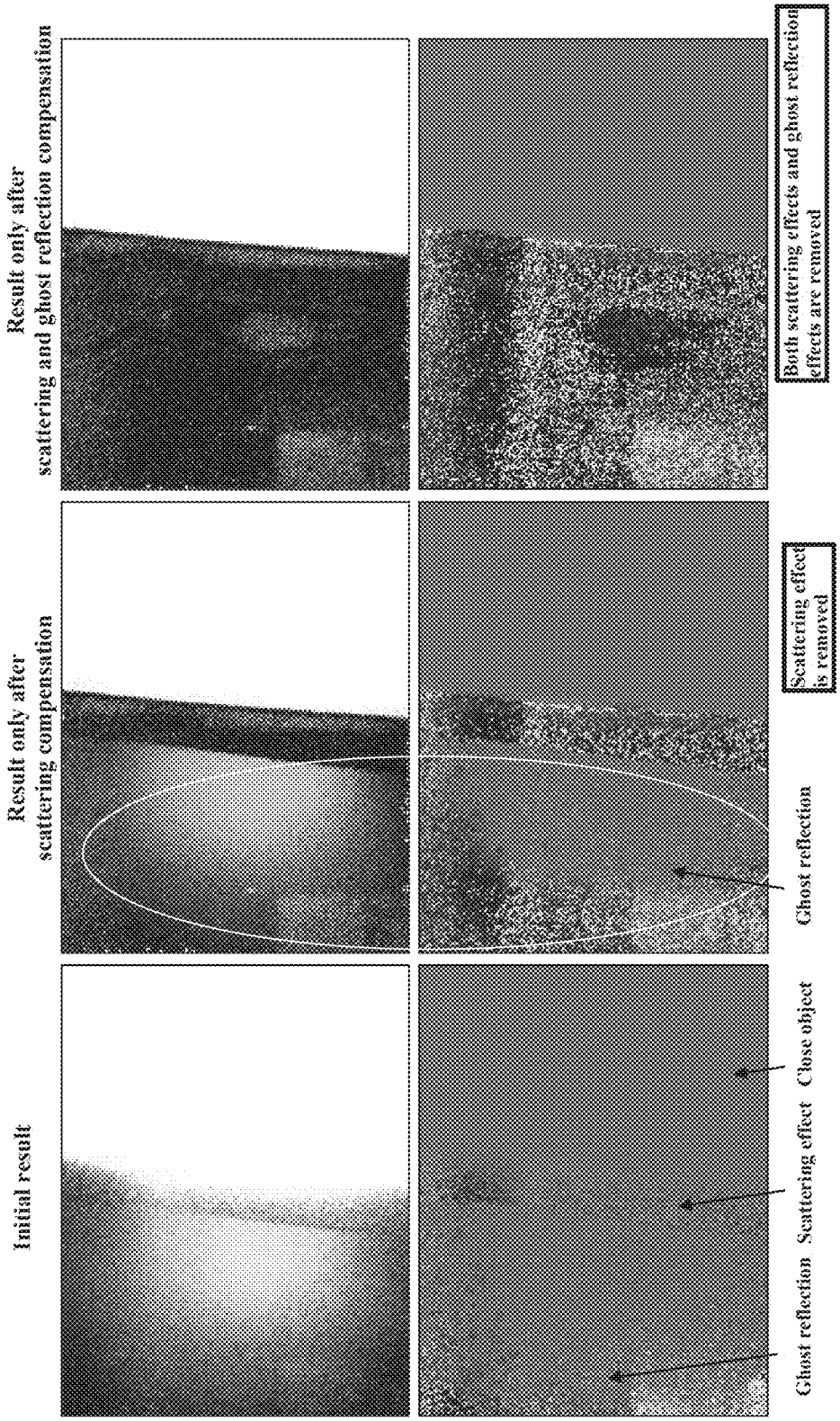
FIG. 13 shows an execution result of ghost reflection compensation according to an embodiment of the present disclosure.

FIG. 13 illustrates the advantageous effects of ghost reflection compensation according to embodiments of the present disclosure, wherein a confidence image and a depth image corresponding to the image shown in FIG. 4A are shown, respectively. The left part respectively indicates the confidence image and depth image corresponding to the original scene image from top to bottom, which includes scattering and ghost reflection, while the middle part respectively indicates the confidence image and depth image after compensation from top to bottom. It can be seen that, since the scattering compensation is mainly performed, even though scattering noise in the image has been removed by the scattering compensation, ghost reflection still exists in the left part of the image. The right part respectively indicates the confidence image and depth image compensated by the disclosed method from top to bottom, from which it can be seen that the ghost reflection in the image can be effectively removed by the method according to the present disclosure, and a high-quality output image can be obtained.

Hereinabove the problem of ghost reflection and the compensation operation of ghost reflection are mainly described by using examples in iToF sensors. However, as mentioned above, the ghost reflection does not depend on the emitter or the image sensor, but mainly depends on components in the image pick-up device that cause light reflection, especially it mainly depends on the usage of photographic filters and/or lenses in the camera. This means that this phenomenon may be observed on other 3D measurement systems using light, including (but not limited to):

An indirect ToF sensor using a full field of view emitter,
An indirect ToF sensor using a spot ToF emitter,
A direct ToF sensor,
Structural light sensor,
Other types of ToF sensors.

Ghost reflection compensation for other types of ToF sensors according to embodiments of the present disclosure will be described below with reference to the drawings.

Figure 14A:
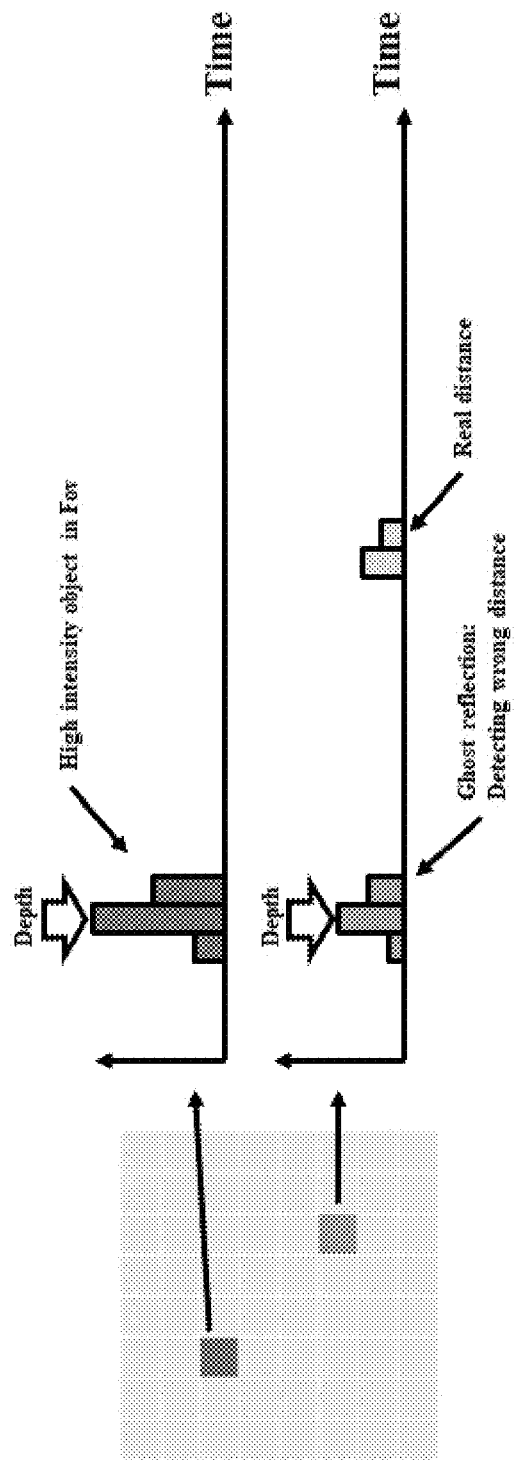
FIGS. 14A and 14B illustrate ghost reflection compensation for a dToF sensor according to an embodiment of the present disclosure.
Figure 14B:
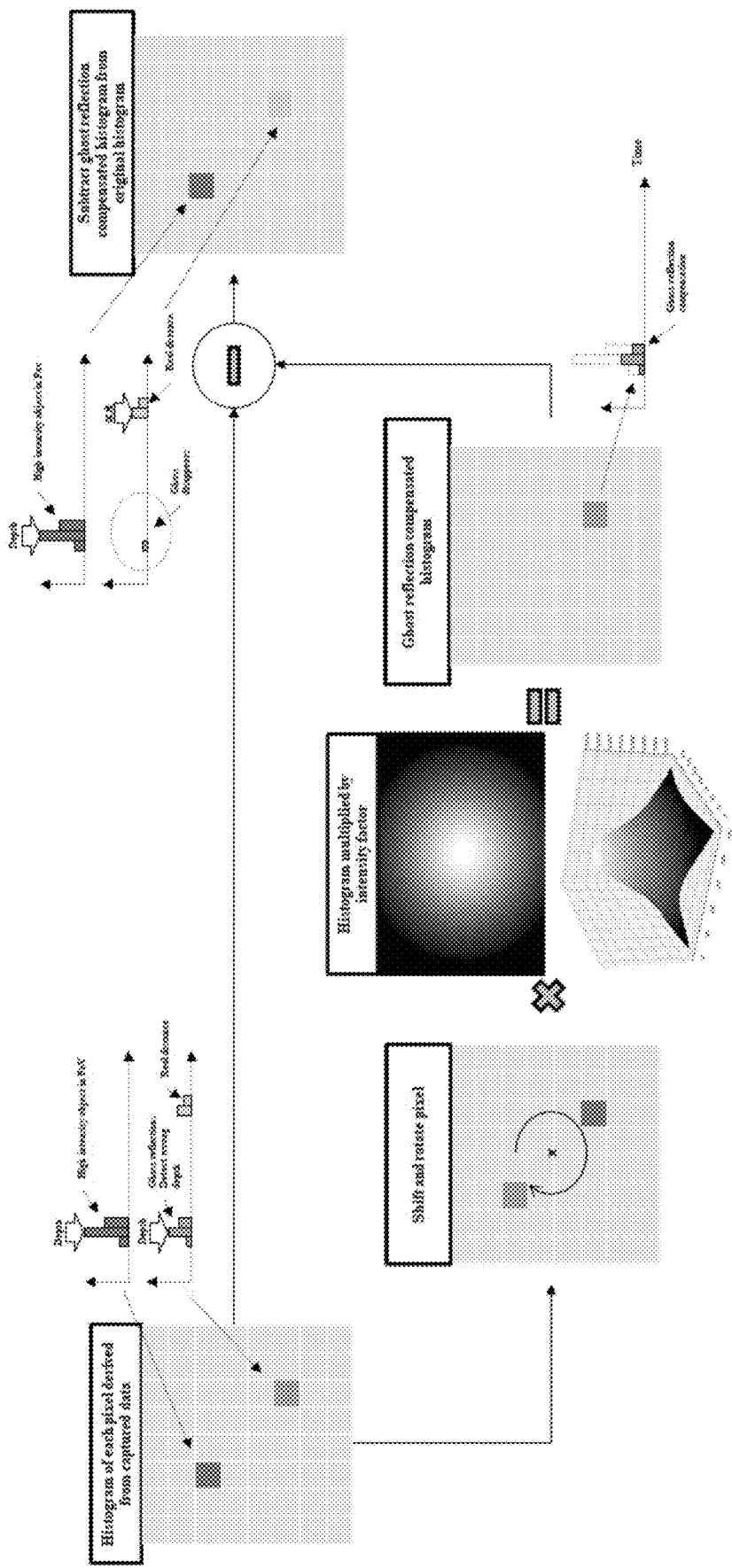

FIGS. 14A and 14B illustrate the ghost reflection compensation when taking an image with a direct ToF (dToF) sensor.

Unlike iTOF, dToF concentrates light energy in a short time. It includes generating photon packets by short pulses of laser or LED, and directly calculating the propagation time of these photons during which they reach the target and return. Then, appropriate techniques can be used to accumulate multiple events into a histogram, so as to identify the position of target peak on the background noise that is usually evenly distributed. For example, this technique may be a technique called time-dependent single photon counting (TCSPC), which is known in the art and will not be described in detail here.

For dToF, ghost reflection can be represented as "ghost peak" in the histogram of affected pixels. As shown in FIG. 14A, the upper histogram corresponds to the histogram of an object with high intensity in the field of view (FoV), where the peak value indicates its corresponding depth. The lower histogram corresponds to the histogram at the position where the ghost reflection occurs, in which a depth peak also appears due to the influence of ghost reflection, which will lead to false depth detection.

According to embodiments of the present disclosure, ghost reflection compensation can be performed for dToF. Particularly, for the pixel histogram obtained from the captured data, ghost reflection compensation is performed in the manner described above, such as shifting and rotating, multiplying and subtracting, as shown in FIG. 14B. It can be seen from the output histogram on the right side that by means of the ghost reflection compensation of the present disclosure, the histogram corresponding to the ghost reflection is significantly suppressed, and its peak value is much smaller than that of the real object, so that it will not cause false depth detection.

According to an embodiment, for dToF, its ghost reflection compensation model can also be generated as described above with reference to FIG. 10, except that a pixel histogram obtained from the captured data is input. Moreover, any other operation as described above can be equally applicable to dToF. According to another embodiment, considering that the ghost reflection compensation model mainly corresponds to a component in the image pick-up device that causes light reflection, such as lens and/or filter, after the ghost reflection compensation model is obtained for this component by using any ToF sensor, the model can be applied to other types of ToF sensors, even other types of sensors using this component.

Figure 15:
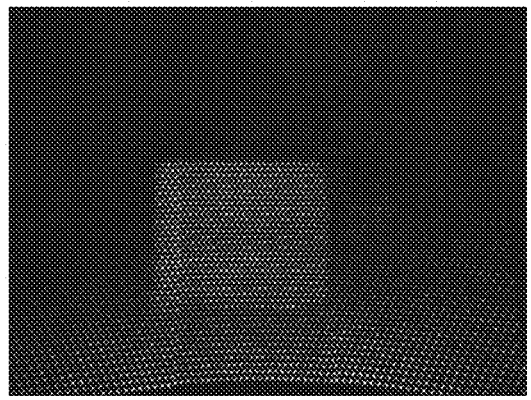
FIG. 15 illustrates ghost reflection compensation for a spot ToF according to an embodiment of the present disclosure.
Figure 15:
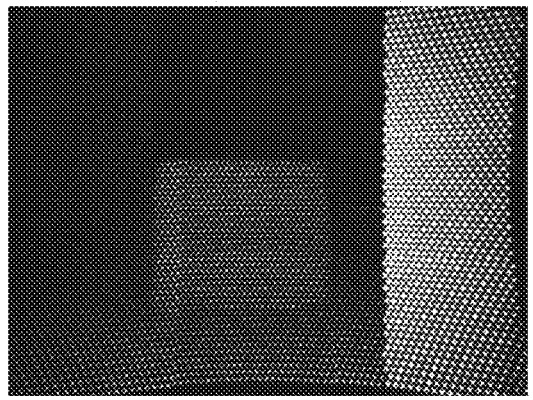
Figure 15:
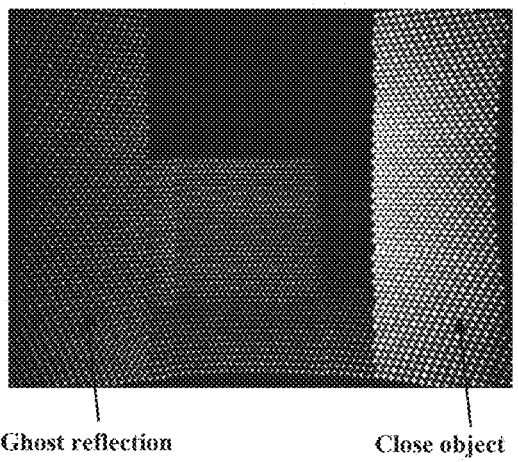
Figure 15:
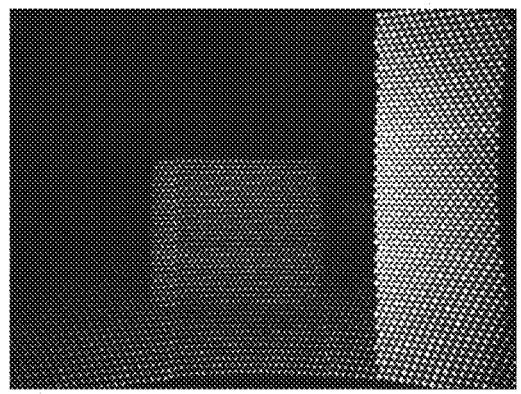

FIG. 15 shows the ghost reflection compensation when taking an image with a spot ToF (spotToF) sensor. FIG. 15(a) shows a confidence image taken when there is no close object, and (b) shows an ideal confidence image obtained when there is a close object, where even if there is a close object in the scene, there will be no other point information than the point information of the close object itself. (c) shows a confidence image with ghost reflection, in which it can be seen that when there is a close object on the right side of the scene, new dots will appear on the left side of the scene. These new dots are generated by ghost reflection, and they may produce the wrong depth or may mix the signal with the current spots. (d) shows a confidence image after compensation of ghost reflection by using the solution of the present disclosure, in which new dots caused by ghost reflection are effectively removed, and the image quality is improved.

According to embodiments of the present disclosure, the ghost reflection compensation function according to the present disclosure can be used automatically or selected by the user.

As an example, the ghost compensation function of the present invention can be automatically implemented. For example, the ghost compensation function can be associated with a specific shooting mode of the camera, and the ghost compensation function will automatically start up when the shooting mode is turned on during shooting. For example, in a close-range shooting mode, such as macro mode, portrait mode, and etc., the ghost compensation function will be automatically turned on, while in a long-range shooting mode, such as landscape mode, etc., the ghost compensation function will not be automatically turned on. As another example, the camera can also determine whether to automatically turn on the ghost compensation function according to the distance from the subject. For example, when the distance from the subject is greater than a specific distance threshold, it can be regarded as long-range shooting and the ghost compensation function needs not to be turned on, while when the distance from the subject is less than a specific distance threshold, it can be regarded as close-range shooting, and the ghost compensation function will be turned on.

As an example, the ghost compensation function of the present invention can be set by a user. For example, a prompt will appear on the camera's shooting operation interface to prompt the user whether to turn on the ghost compensation function. When the user selects this function, the ghost compensation function can be turned on to compensate/eliminate the ghost when taking pictures, for example, by a button that appears on a touch user interface or a button on the camera that can turn on the ghost compensation.

According to embodiments of the present disclosure, the ghost reflection compensation model according to the present disclosure can be stored in various ways. As an example, the model can be integrated with the image pick-up device, especially the camera lens including the lens and the filter, so that the model can be used fixedly even if the camera lens is exchanged to other devices, without needing to derive the model. On the other hand, the model can be stored in a device that can be connected with a camera to take pictures, such as a portable electronic device, etc.

As mentioned above, the ghost reflection is particularly unfavorable for obtaining depth information, so the technical solution of the present disclosure is especially suitable for various applications that need to obtain depth information about objects in a shooting scene, such as an image pick-up device that need to measure the depth information, etc. For example, the technical solution of the present disclosure can be suitable for an image pick-up device that adopts sensors based on ToF technology, such as iToF, full-field ToF, spot ToF, etc. For example, the technical solution of the present disclosure can be suitable for a 3D imaging device, because the depth/distance information is very important for obtaining good 3D images.

Note that even in the case of RGB sensors, the reflection ghost effect is not as critical as that in 3D measurement systems, the embodiments of the present disclosure can also be applied to RGB sensors, especially when there is only one photographic filter in the system, for example, can be applied to a portable mobile device whose camera is equipped with coverglass, which is realized as a filter in this scene.

In addition, the solution of the present disclosure can be applied to some specific shooting modes that may produce ghost reflection. For example, in view of the fact that a large amount of light reflection may be caused when shooting a close-range object, which may then lead to ghost reflection, the ghost reflection compensation solution according to the present disclosure is also particularly suitable for the modes in the image pick-up device related to shooting the close-range objects, such as close-range shooting mode, background blurring mode, etc.

Through the solution of the present disclosure, the influence of ghost reflection in the image can be effectively eliminated. Particularly, through the solution of the present disclosure, the depth information, i.e., the distance information, of the objects in the scene can be accurately determined, so that it is possible to accurately focus when taking pictures, or to obtain high-quality images, so as to contribute to subsequent image-based applications.

For example, for the background blurring effect, the solution of the present disclosure can eliminate the wrong depth and obtain an appropriate object distance. For example, for an auto-focus application, even if the object is close to the camera, it is possible to accurately identify the distance from the object distance and take photos with a good focusing distance. For example, for a face ID recognition, when a photographic subject is close to a camera for face recognition, the solution of the present disclosure can effectively remove the ghost in the image, and then obtain a high-quality image for recognition.

It should be pointed out that the technical solution of the present disclosure is especially suitable for cameras in portable devices, such as mobile phones, tablets and so on. The lens and/or the camera filter for the camera can be fixed or replaceable.

Figure 7:
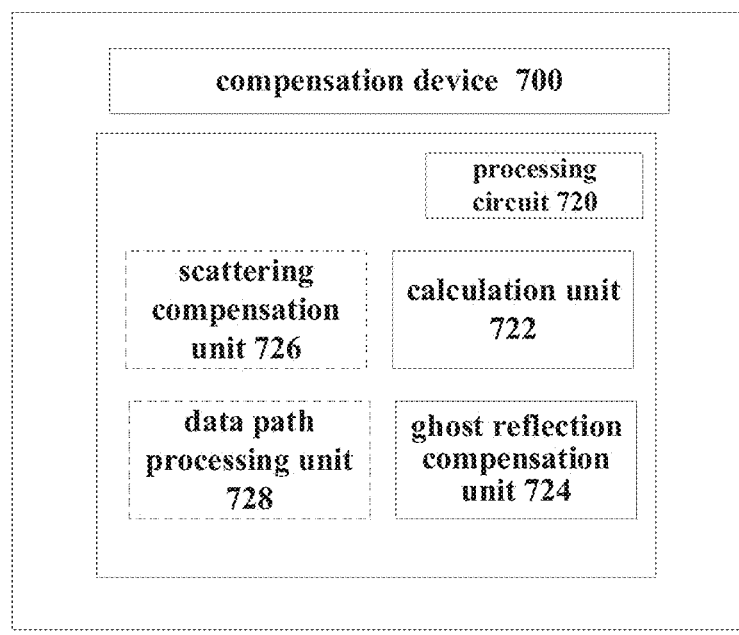
FIG. 7 shows a block diagram of an electronic device capable of performing ghost reflection compensation according to an embodiment of the present disclosure.

An electronic device capable of performing ghost reflection compensation according to the present disclosure will be described below. FIG. 7 shows a block diagram of an electronic device capable of performing ghost reflection compensation according to an embodiment of the present disclosure. The electronic device 700 includes a processing circuit 720, which can be configured to weight an image to be compensated including ghost reflection by using a ghost reflection compensation model; and combining the to-be-compensated image and the weighted image to eliminate the ghost reflection from the image.

In the structural example of the above device, the processing circuit 720 may be in the form of a general-purpose processor, or may be a dedicated processing circuit, such as an ASIC. For example, the processing circuit 720 can be configured by a circuit (hardware) or a central processing device such as a central processing unit (CPU). In addition, the processing circuit 720 may carry a program (software) for operating the circuit (hardware) or the central processing device. The program can be stored in a memory (such as arranged in the memory) or an external storage medium connected from the outside, and downloaded via a network (such as the Internet).

According to an embodiment of the present disclosure, the processing circuit 720 may include various units for realizing the above functions, such as a calculation unit 722 for weighting an image to be compensated including ghost reflection by using a ghost reflection compensation model; and a ghost reflection compensation unit 724 for combining the to-be-compensated image and the weighted image to eliminate the ghost reflection from the image. Particularly, the processing circuit 720 may further include a scattering compensation unit 726 and a data path processing unit 728. Each unit can operate as described above, which will not be described in detail here.

The scattering compensation unit 726 and the data path processing unit 728 are drawn with dotted lines to illustrate that these units are not necessarily included in the processing circuit. As an example, these units may be located in the terminal side electronic device but outside the processing circuit, or even outside the electronic device 700. Note that although each unit is shown as a separate unit in FIG. 7, one or more of these units may be combined into one unit or divided into multiple units.

It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as independent physical entities, or may be implemented by a single entity (for example, a processor(CPU or DSP, etc.), an integrated circuit, etc.). Furthermore, that the foregoing units are indicated by dotted lines in the figure indicates that the foregoing units may not actually exist, and the operation/functionality they achieve can be implemented by the processing circuit itself.

It should be understood that FIG. 7 is only a schematic structural configuration of the terminal-side electronic device, and the terminal-side electronic device 700 may also include other possible components (e.g., memory, etc.). Optionally, the control-side electronic device 700 may also include other components not shown, such as a memory, a network interface, a controller, and the like. For example, the processing circuit may be directly or indirectly (for example, other components may be disposed therebetween) connected to the memory for data access.

The memory may store various types of information generated by the processing circuit 720. The memory can also be located inside the terminal-side electronic device but outside the processing circuit, or even outside the terminal-side electronic device. The memory may be a volatile memory and/or a non-volatile memory, for example, the memory may include, but not limited to, random access memory (RAM), dynamic random access memory (DRAM), static random access memory (SRAM), read-only memory (ROM), and flash memory.

Figure 16:
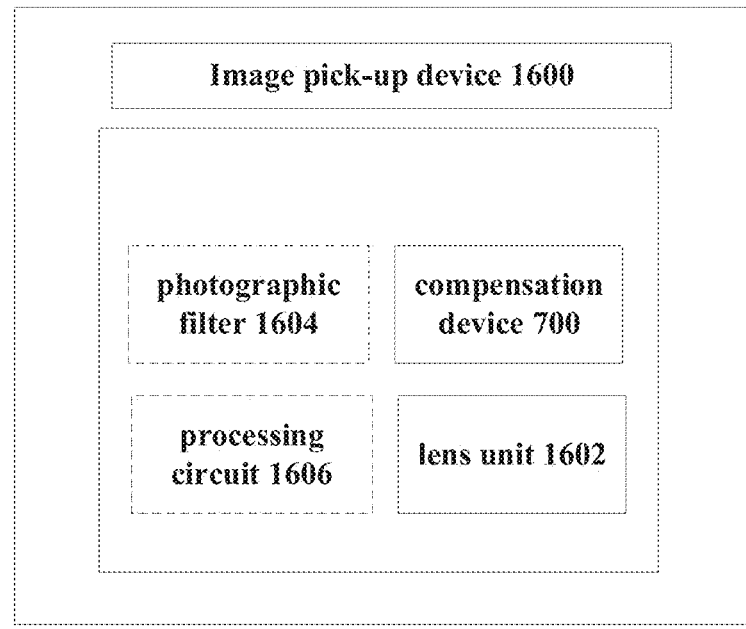
FIG. 16 shows an image pick-up device according to an embodiment of the present disclosure.

An image pick-up device according to the present disclosure will be described below. FIG. 16 shows a block diagram of an image pick-up device according to an embodiment of the present disclosure. The image pick-up device 1600 includes a compensation device 700, which can be used for image compensation, especially ghost reflection compensation, and the compensation device can be realized by an electronic device, such as the electronic device 700 as described above.

The image pick-up device 1600 may include a lens unit 1602, which may include various optical lenses known in the art for imaging an object on a sensor by optical imaging.

The image pick-up device 1600 may include a photographic filter 1604, which may include various photographic filters known in the art, which may be mounted to the front of the lens.

The image pick-up device 1600 may further include a processing circuit 1606, which may be used to process the obtained image. As an example, the compensated image can be further processed, or the image to be compensated can be preprocessed.

The image pick-up device 1600 may also include various image sensors, such as the aforementioned ToF-based sensors. However, these sensors may be located outside the image pick-up device 1600.

It should be noted that the photographic filter and the processing circuit are drawn with dotted lines, which is intended to illustrate that these units are not necessarily included in the image pick-up device 1600, and can be located outside the image pick-up device 1600 and even be connected and/or communicated by a known way. It should be noted that although each unit is shown as a separate unit in FIG. 16, one or more of these units may be combined into one unit or divided into multiple units.

In the structural example of the above device, the processing circuit 1606 may be in the form of a general-purpose processor, or may be a dedicated processing circuit, such as an ASIC. For example, the processing circuit 1606 can be configured by a circuit (hardware) or a central processing device such as a central processing unit (CPU). In addition, the processing circuit 1606 may carry a program (software) for operating the circuit (hardware) or the central processing device. The program can be stored in a memory (such as arranged in the memory) or an external storage medium connected from the outside, and downloaded via a network (such as the Internet).

The disclosed technology can be applied to various products.

For example, the technology of the present disclosure can be applied to the image pick-up device itself, such as being built into and integrated with the camera lens, so that the technology of the present disclosure can be in the form of a software program to be executed by the processor of the image pick-up device, or integrated together in the form of an integrated circuit or a processor: or used in a device connected with the image pick-up device, such as a portable mobile device equipped with the image pick-up device. In this way, the disclosed technology can be implemented by a processor of the image pick-up device in the form of a software program, or integrated together in the form of an integrated circuit, a processor, or even integrated in an existing processing circuit, for performing ghost reflection compensation during photographing.

The disclosed technology can be applied to various image pick-up devices, such as lenses installed in portable devices, image pick-up devices on unmanned aerial vehicles, image pick-up devices in monitoring devices, etc.

The invention can be used in many applications. For example, the present invention can be used to monitor, identify, and track objects in still images or moving videos captured by cameras, and is particularly advantageous for portable devices equipped with cameras, (camera-based) mobile phones, and the like.

Figure 17:
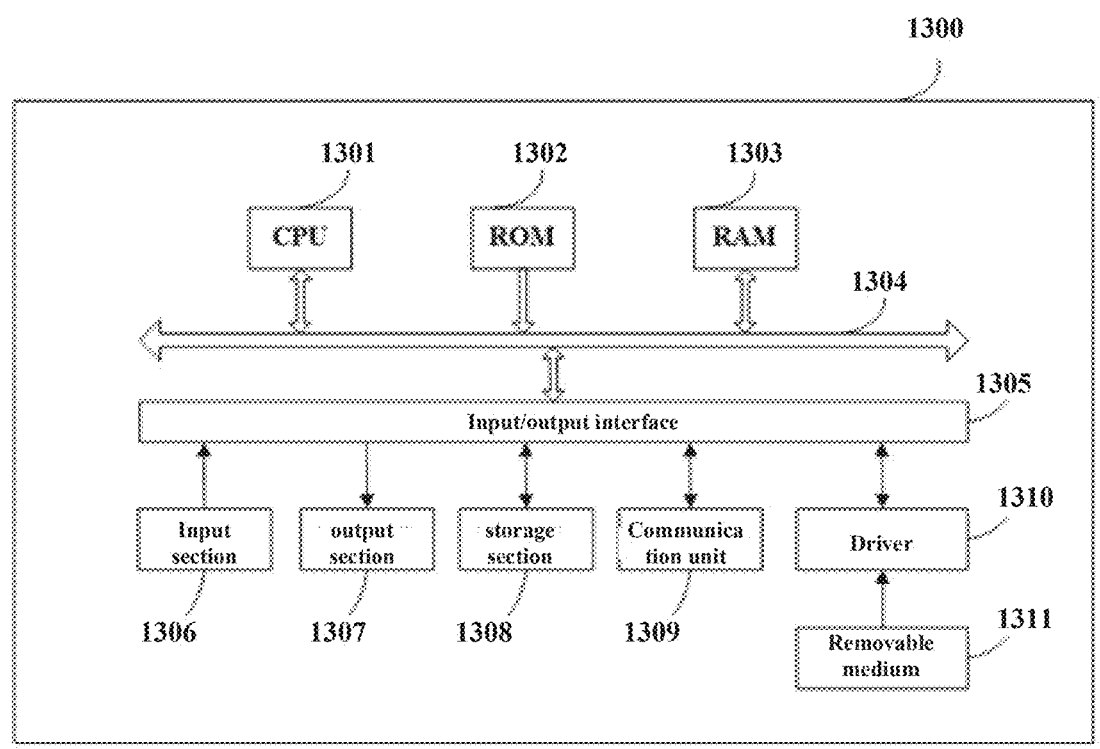
FIG. 17 shows a block diagram showing an exemplary hardware configuration of a computer system capable of implementing an embodiment of the present invention.

In addition, it should be understood that the processes and devices described above may also be implemented by software and/or firmware. When implemented by software and/or firmware, programs constituting the software can be installed from a storage medium or a network to a computer having a dedicated hardware structure, such as a general-purpose personal computer 1300 shown in FIG. 17, and the computer can perform a variety of functions by installing various programs thereon. FIG. 17 is a block diagram illustrating an example structure of a personal computer as an information processing apparatus that can be adopted in an embodiment of the present disclosure. In one example, the personal computer may correspond to the above-described exemplary transmitting device or terminal-side electronic device according to the present disclosure.

In FIG. 17, a central processing unit (CPU) 1301 performs various processes according to a program stored in a read only memory (ROM) 1302 or a program loaded from a storage section 1308 to a random-access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1605 is also connected to the bus 1304.

The following components are connected to the input/output interface 1305: an input section 1306 including a keyboard, a mouse, etc.: an output section 1307 including a display, such as a cathode ray tube (CRT), a liquid crystal display (LCD), etc., and a speaker, etc.: a storage section 1308 including hard disks, etc.; and communication section 1309 including network interface vehicleds such as LAN vehicleds, modems, etc. The communication section 1309 performs communication processing via a network such as the Internet.

A driver 1310 is also connected to the input/output interface 1305 as needed. A removable medium 1611 such as a magnetic disk, an optical disk, a magneto-optical disk, a semiconductor memory, etc. is installed on the drive 1310 as needed, so that a computer program read out therefrom can be installed into the storage section 1308 as needed.

In a case where the above-mentioned processes are realized by a software, the programs constituting the software are installed from a network such as the Internet or a storage medium such as a removable medium 1311.

Those skilled in the art should understand that such a storage medium is not limited to the removable medium 1311 shown in FIG. 17 in which the program is stored and which is distributed separately from the device to provide the program to the user. Examples of the removable medium 1311 include a magnetic disk (including a floppy disk (registered trademark)), an optical disk (including a CD-ROM and a digital versatile disk (DVD)), and a magneto-optical disk (including a mini disk (MD) (registered trademark))) and semiconductor memory. Alternatively, the storage medium may be the ROM 1302, a hard disk included in the storage section 1308, and the like, in which programs are stored and which are distributed to users along with the device containing them.

It should be noted that the methods and devices described herein can be implemented as software, firmware, hardware or any combination thereof. Some components can be implemented as software running on a digital signal processor or microprocessor, for example. Other components can be implemented as hardware and/or application specific integrated circuits, for example.

In addition, the method and system of the present invention can be implemented in various ways. For example, the method and system of the present invention can be implemented by software, hardware, firmware or any combination thereof. The above-described sequence of steps of the method is only illustrative, and the steps of the method of the present invention are not limited to the above-described sequence unless otherwise specifically stated. Furthermore, in some embodiments, the present invention can also be embodied as a program recorded in a recording medium, including machine-readable instructions for implementing the method according to the present invention. Therefore, the present invention also covers a recording medium storing a program for implementing the method according to the present invention. Such storage media may include, but are not limited to, floppy disks, optical disks, magneto-optical disks, memory cards, memory sticks, etc.

Those skilled in the art should realize that the boundaries between the above operations are only illustrative. Multiple operations can be combined into a single operation, which can be distributed among additional operations, and the operations can be performed at least partially overlapping in time. Furthermore, alternative embodiments may include multiple instances of specific operations, and the order of operations may be changed in other various embodiments. However, other modifications, changes and substitutions are also possible. Therefore, the description and drawings should be regarded as illustrative rather than restrictive.

In addition, embodiments of the present disclosure may also include the following exemplary examples (EE).

EE 1. An electronic device for compensating for ghost reflection in an image captured by an image pick-up device, including a processing circuit configured to:
  weight an image to be compensated containing the ghost reflection by using a ghost reflection compensation model, wherein the ghost reflection compensation model is related to intensity distribution of the ghost reflection in the image caused by light reflection in the image pick-up device during capturing; and
  combine the to-be-compensated image and the weighted image to eliminate the ghost reflection from the image.

EE 2. The electronic device according to EE 1, wherein the ghost reflection compensation model is trained from a predetermined number of calibration images, and the ghost reflection compensation model is trained so that, after application of the ghost reflection compensation model, an intensity variation of a ghost reflection area in the calibration image compared to an area adjacent to the ghost reflection area is smaller than a certain threshold or is the smallest.

EE 3. The electronic device according to EE 2, wherein in the training of the ghost reflection compensation model, the intensity variation is determined by:
  center-shifting the calibration image according to a preset center-shift parameter of the ghost reflection compensation model to be trained, rotating the calibrating image by using the shifted center as an axis, and then reversely center-shifting the rotated image according to the parameter;
  multiplying the shifted and rotated image by the ghost reflection compensation model with preset intensity factor parameters; and
  subtracting, from the pixel intensities of positions in the calibration image, pixel intensities of corresponding positions in the image obtained by multiplying the ghost reflection compensation model, so as to obtain the intensity variation.

EE 4. The electronic device of EE 1, wherein the ghost reflection compensation model includes a ghost reflection factor corresponding to each sub-region in the image, wherein a sub-region includes at least one pixel.

EE 5. The electronic device of EE 4, wherein the ghost reflection compensation model is set such that the ghost reflection factor at a sub-region near the center of the image is greater than the ghost reflection factor at a sub-region near the edge of the image.

EE 6. The electronic device according to EE 4, wherein the ghost reflection factor is determined based on a Gaussian distribution.

EE 7. The electronic device according to any one of EEs 4-6, wherein the processing circuit is configured to:
  perform intensity scaling on each sub-region in the captured image by a corresponding ghost reflection intensity factor in the ghost reflection compensation model, thereby obtaining an intensity-scaled image as the weighted image.

EE 8. The electronic device according to EE 1, wherein the ghost reflection model is related to a characteristic of a component in the capturing device that causes light reflection that causes ghost reflection during capturing, and wherein the parameters of the ghost reflection model depend on the characteristics of the component.

EE 9. The electronic device according to EE 8, wherein the component includes at least one of a lens and a photographic filter.

EE 10. The electronic device according to EE 8 or 9, wherein the ghost reflection model includes at least parameters related to center shift and related parameters for determining Gaussian distributions of ghost reflection factors.

EE 11. The electronic device according to EE 1, wherein the ghost reflection model includes parameters related to center shift, and wherein the processing circuit is configured to:
  center-shift the image to be compensated according to the parameters, rotate the image by using the shifted center as an axis, and then reversely center-shift the rotated image according to the parameters; and
  weight the shifted and rotated image by the ghost reflection compensation model to obtain a weighted image.

EE 12. The electronic device according to EE 11, wherein the shifting and rotating is performed so that the ghost in the shifted and rotated image is located at a position corresponding to the position of an object in an original image, and the object in the shifted and rotated image is located at a position corresponding to the position of the ghost in the original image.

EE 13. The electronic device according to EE 1, wherein the processing circuit is configured to:
  subtract, from pixel intensities at positions in the weighted image, pixel intensities at corresponding positions in the image to be compensated, so as to obtain a compensated image.

EE 14. The electronic device according to EE 1, wherein the image to be compensated corresponds to at least two sub-images, and
  the ghost reflection compensation is performed for each sub-image, thereby obtaining a compensated image by combining the at least two sub-images after compensation.

EE 15. The electronic device according to EE 14, wherein the at least two sub-images include an I image and a Q image obtained by capturing original image data.

EE 16. The electronic device according to EE 1, wherein the image pick-up device is an optical image pick-up device using a photographic filter.

EE 17. The electronic device according to any of EEs 1-16, wherein the image pick-up device includes a ToF sensor, and the image includes a depth image.

EE 18. A method of compensating for ghost reflection in an image captured by an image pick-up device, comprising:
  calculation step of weighting an image to be compensated containing the ghost reflection by using a ghost reflection compensation model, wherein the ghost reflection compensation model is related to intensity distribution of the ghost reflection in the image caused by light reflection in the image pick-up device during capturing; and
  compensation step of combining the to-be-compensated image and the weighted image to eliminate the ghost reflection from the image.

EE 19. The method according to EE 18, wherein the ghost reflection compensation model is trained from a predetermined number of calibration images, and the ghost reflection compensation model is trained so that, after application of the ghost reflection compensation model, the intensity variation of a ghost reflection area in the calibration image compared to an area adjacent to the ghost reflection area is smaller than a certain threshold or is the smallest.

EE 20. The method according to EE 19, wherein in the training of the ghost reflection compensation model, the intensity variation is determined by:
  center-shifting the calibration image according to a preset center-shift parameter of the ghost reflection compensation model to be trained, rotating the calibrating image by using the shifted center as an axis, and then reversely center-shifting the rotated image according to the parameter;
  multiplying the shifted and rotated image by the ghost reflection compensation model with preset intensity factor parameters; and
  subtracting, from the pixel intensities of positions in the calibration image, pixel intensities of corresponding positions in the image obtained by multiplying the ghost reflection compensation model, so as to obtain the intensity variation.

EE 21. The method of EE 18, wherein the ghost reflection compensation model includes a ghost reflection factor corresponding to each sub-region in the image, wherein a sub-region includes at least one pixel.

EE 22. The method of EE 20, wherein the ghost reflection compensation model is set such that the ghost reflection factor at a sub-region near the center of the image is greater than the ghost reflection factor at a sub-region near the edge of the image.

EE 23. The method according to EE 20, wherein the ghost reflection factor is determined based on a Gaussian distribution.

EE 24. The method according to any one of EEs 20-22, wherein the calculation step further comprises:
  performing intensity scaling on each sub-region in the captured image by a corresponding ghost reflection intensity factor in the ghost reflection compensation model, thereby obtaining an intensity-scaled image as the weighted image.

EE 25. The method according to EE 18, wherein the ghost reflection model is related to a characteristic of a component in the capturing device that causes light reflection that causes ghost reflection during capturing, and wherein the parameters of the ghost reflection model depend on the characteristics of the component.

EE 26. The method according to EE 24, wherein the component includes at least one of a lens and a photographic filter.

EE 27. The method according to EE 24 or 25, wherein the ghost reflection model includes at least parameters related to center shift and related parameters for determining Gaussian distributions of ghost reflection factors.

EE 28. The method according to EE 18, wherein the ghost reflection model includes parameters related to center shift, and wherein the calculation step further comprises:
  center-shift the image to be compensated according to the parameters, rotate the image by using the shifted center as an axis, and then reversely center-shift the rotated image according to the parameters; and
  weight the shifted and rotated image by the ghost reflection compensation model to obtain a weighted image.

EE 29. The method according to EE 28, wherein the shifting and rotating is performed so that the ghost in the shifted and rotated image is located at a position corresponding to the position of an object in an original image, and the object in the shifted and rotated image is located at a position corresponding to the position of the ghost in the original image.

EE 30. The method according to EE 18, wherein the compensation step further comprises:
  subtracting, from pixel intensities at positions in the weighted image, pixel intensities at corresponding positions in the image to be compensated, so as to obtain a compensated image.

EE 31. The method according to EE 18, wherein the image to be compensated corresponds to at least two sub-images, and
  the ghost reflection compensation is performed for each sub-image, thereby obtaining a compensated image by combining the at least two sub-images after compensation.

EE 32. The method according to EE 31, wherein the at least two sub-images include an I image and a Q image obtained by capturing original image data.

EE 33. The method according to EE 18, wherein the image pick-up device is an optical image pick-up device using a photographic filter.

EE 34. The method according to any of EEs 18-33, wherein the image pick-up device includes a ToF sensor, and the image includes a depth image.

EE 35. An electronic device for ghost reflection compensation for image capturing using a direct time-of-flight (dToF) sensor, comprising a processing circuit configured to:
  weight a pixel histogram to be compensated containing the ghost reflection, which is derived from captured original data, by using a ghost reflection compensation model; and
  combine the to-be-compensated pixel histogram and the weighted pixel histogram to eliminate the ghost reflection.

EE 36. The electronic device according to EE 35, wherein the ghost reflection model includes parameters related to center shift, and wherein the processing circuit is configured to:
  center-shift the histogram to be compensated according to the parameters, rotate the histogram by using the shifted center as an axis, and then reversely center-shift the rotated histogram according to the parameters; and
  weight the shifted and rotated histogram by the ghost reflection compensation model to obtain a weighted histogram.

EE 37. The electronic device according to EE 35, wherein the shifting and rotating is performed so that a ghost reflection peak in the shifted and rotated histogram correspond to an object peak in an original histogram.

EE 38. The electronic device according to EE 35, wherein the processing circuit is configured to:
  subtract, from values at positions in the weighted histogram, values at corresponding positions in the histogram to be compensated, so as to obtain a compensated histogram.

EE 39. A method of ghost reflection compensation for image capturing using a direct time-of-flight (dToF) sensor, comprising:
  calculation step of weighting a pixel histogram to be compensated containing the ghost reflection, which is derived from original captured data, by using a ghost reflection compensation model; and
  compensation step of combining the to-be-compensated pixel histogram and the weighted pixel histogram to eliminate the ghost reflection.

EE 40. The method according to EE 39, wherein the ghost reflection model includes parameters related to center shift, and wherein the calculation step further comprises:

center-shifting the histogram to be compensated according to the parameters, rotating the histogram by using the shifted center as an axis, and then reversely center-shifting the rotated histogram according to the parameters; and weighting the shifted and rotated histogram by the ghost reflection compensation model to obtain a weighted histogram.

EE 41. The method according to EE 39, wherein the shifting and rotating is performed so that a ghost reflection peak in the shifted and rotated histogram correspond to an object peak in an original histogram.

EE 42. The method according to EE 39, wherein the compensation step further comprises:

subtracting, from values at positions in the weighted histogram, values at corresponding positions in the histogram to be compensated, so as to obtain a compensated histogram.

EE 43. A device comprising at least one processor; and at least one storage device that stores instructions thereon that, when executed by the at least one processor, cause the at least one processor to execute the method according to any one of EEs 18-34 and 39-42.

EE 44. A storage medium storing instructions which, when executed by a processor, cause execution of the method according to any one of EEs 18-34 and 39-42.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

Although some specific embodiments of the present disclosure have been described in detail, those skilled in the art should understand that the above-described embodiments are merely illustrative and do not limit the scope of the present disclosure. Those skilled in the art should understand that the above-described embodiments may be combined, modified, or replaced without departing from the scope and essence of the present disclosure. The scope of the present disclosure is defined by the appended claims.

What is claimed is:

1. An electronic device for compensating for ghost reflection in an image captured by an image pick-up device, the electronic device comprising:

processing circuitry configured to:

weight an image to be compensated containing the ghost reflection by using a ghost reflection compensation model, wherein the ghost reflection compensation model is related to intensity distribution of the ghost reflection in the image caused by light reflection in the image pick-up device during capturing; and combine the to-be-compensated image and the weighted image to eliminate the ghost reflection from the image, wherein the ghost reflection model includes parameters related to center shift, and the processing circuitry is configured to:

center-shift the image to be compensated according to the parameters, rotate the image by using the shifted center as an axis, and then reversely center-shift the rotated image according to the parameters; and weight the shifted and rotated image by the ghost reflection compensation model to obtain a weighted image.

2. The electronic device of claim 1, wherein the ghost reflection compensation model is trained from a predetermined number of calibration images, and the ghost reflection compensation model is trained so that, after application of the ghost reflection compensation model, an intensity variation of a ghost reflection area in the calibration image compared to an area adjacent to the ghost reflection area is smaller than a certain threshold or is the smallest.

3. The electronic device of claim 2, wherein in the training of the ghost reflection compensation model, the intensity variation is determined by:

center-shifting the calibration image according to a preset center-shift parameter of the ghost reflection compensation model to be trained, rotating the calibrating image by using the shifted center as an axis, and then reversely center-shifting the rotated image according to the parameter;

multiplying the shifted and rotated image by the ghost reflection compensation model with preset intensity factor parameters; and subtracting, from the pixel intensities of positions in the calibration image, pixel intensities of corresponding positions in the image obtained by multiplying the ghost reflection compensation model, so as to obtain the intensity variation.

4. The electronic device of claim 1, wherein the ghost reflection compensation model includes a ghost reflection factor corresponding to each sub-region in the image, and a sub-region includes at least one pixel.

5. The electronic device of claim 4, wherein the ghost reflection compensation model is set such that the ghost reflection factor at a sub-region near the center of the image is greater than the ghost reflection factor at a sub-region near the edge of the image.

6. The electronic device of claim 4, wherein the processing circuitry is configured to:

perform intensity scaling on each sub-region in the shifted and rotated image by a corresponding ghost reflection intensity factor in the ghost reflection compensation model, thereby obtaining an intensity-scaled image as the weighted image.

7. The electronic device of claim 1, wherein the ghost reflection model is related to a characteristic of a component in the capturing device that causes light reflection that causes ghost reflection during capturing, and wherein the parameters of the ghost reflection model depend on the characteristics of the component.

8. The electronic device of claim 1, wherein the ghost reflection model includes at least parameters related to center shift and related parameters for determining Gaussian distributions of ghost reflection factors.

9. The electronic device of claim 1, wherein
the shifting and rotating is performed so that the ghost in the shifted and rotated image is located at a position corresponding to the position of an object in an original image, and
the object in the shifted and rotated image is located at a position corresponding to the position of the ghost in the original image.

10. The electronic device of claim 1, wherein the processing circuitry is configured to:
subtract, from pixel intensities at positions in the weighted image, pixel intensities at corresponding positions in the image to be compensated, so as to obtain a compensated image.

11. The electronic device of claim 1, wherein
the image to be compensated corresponds to at least two sub-images, and
the ghost reflection compensation is performed for each sub-image, thereby obtaining a compensated image by combining the at least two sub-images after compensation.

12. An electronic device for ghost reflection compensation for image capturing using a direct time-of-flight (dToF) sensor, the electronic device comprising:
processing circuitry configured to:
weight a pixel histogram to be compensated containing the ghost reflection, which is derived from captured original data, by using a ghost reflection compensation model including parameters related to center shift, including:
center-shifting pixels corresponding to the histogram to be compensated according to the parameters,
rotating the pixels corresponding to the histogram to be compensated by using the shifted center as an axis, and then reversely center-shift the rotated pixels corresponding to the histogram to be compensated according to the parameters,
generating a weighted histogram from the shifted and rotated pixels by the ghost reflection compensation model; and
combine the to-be-compensated pixel histogram and the weighted pixel histogram to eliminate the ghost reflection.

13. The electronic device of claim 12, wherein the shifting and rotating of the pixels is performed so that a ghost reflection peak in the weighted histogram corresponds to an object peak in an original histogram.

14. The electronic device of claim 12, wherein the processing circuitry is configured to:
subtract, from values at positions in the weighted histogram, values at corresponding positions in the histogram to be compensated, so as to obtain a compensated histogram.

15. A non-transitory storage medium storing instructions which, when executed by a processor, cause the processor to:
weight an image to be compensated containing the ghost reflection by using a ghost reflection compensation model, wherein the ghost reflection compensation model is related to intensity distribution of the ghost reflection in the image caused by light reflection in the image pick-up device during capturing; and
combine the to-be-compensated image and the weighted image to eliminate the ghost reflection from the image, wherein
the ghost reflection model includes parameters related to center shift, and
the instructions, when executed by a processor, further cause the processor to:
center-shift the image to be compensated according to the parameters, rotate the image by using the shifted center as an axis, and then reversely center-shift the rotated image according to the parameters; and
weight the shifted and rotated image by the ghost reflection compensation model to obtain a weighted image.

16. The non-transitory storage medium of claim 15, wherein
the ghost reflection compensation model includes a ghost reflection factor corresponding to each sub-region in the image, and
the instructions, when executed by a processor, further cause the processor to:
perform intensity scaling on each sub-region in the captured shifted and rotated image by a corresponding ghost reflection intensity factor in the ghost reflection compensation model, thereby obtaining an intensity-scaled image as the weighted image.

17. The non-transitory storage medium of claim 15, wherein the instructions, when executed by a processor, further cause the processor to:
subtract, from pixel intensities at positions in the weighted image, pixel intensities at corresponding positions in the image to be compensated, so as to obtain a compensated image.

* * * * *